(12) United States Patent
Wang

(10) Patent No.: US 11,438,600 B2
(45) Date of Patent: Sep. 6, 2022

(54) IMMERSIVE MEDIA METRICS FOR VIRTUAL REALITY CONTENT WITH MULTIPLE VIEWPOINTS

(71) Applicant: HUAWEI TECHNOLOGIES CO., LTD., Shenzhen (CN)

(72) Inventor: Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/999,564

(22) Filed: Aug. 21, 2020

(65) Prior Publication Data

US 2020/0382796 A1 Dec. 3, 2020

Related U.S. Application Data

(63) Continuation of application No. PCT/US2019/018602, filed on Feb. 19, 2019.
(Continued)

(51) Int. Cl.
*H04N 19/162* (2014.01)
*H04N 19/119* (2014.01)
(Continued)

(52) U.S. Cl.
CPC .......... *H04N 19/162* (2014.11); *H04L 67/38* (2013.01); *H04N 13/344* (2018.05);
(Continued)

(58) Field of Classification Search
CPC .. H04N 19/162; H04N 19/119; H04N 19/176; H04N 19/186; H04N 19/597;
(Continued)

(56) References Cited

U.S. PATENT DOCUMENTS

2017/0118540 A1 4/2017 Thomas et al.
2017/0155912 A1 6/2017 Thomas et al.
(Continued)

FOREIGN PATENT DOCUMENTS

CN 104270646 A 1/2015
CN 106664443 A 5/2017
(Continued)

OTHER PUBLICATIONS

Fraunhofer Hhi, et al., "FS_VR: Viewport-dependent baseline media profile with tile streaming," 3GPP TSG-SA4 Meeting #94, S4-170589, 8 pages.
"Line Transmission of Non-Telephone Signals Video Codec for Audiovisual Services At p × 64 kbits," ITU-T Recommendation H.261, Mar. 1993, 29 pages.
"Transmission of Non-Telephone Signals; Information Technology—Generic Coding of Moving Pictures and Associated Audio Information: Video," ITU-T Recommendation H.262, Jul. 1995, 211 pages.
(Continued)

*Primary Examiner* — Tat C Chio
(74) *Attorney, Agent, or Firm* — Conley Rose, P.C.

(57) ABSTRACT

A method of three hundred and sixty degree) (360°) streaming implemented by a client device. The method includes receiving, by the client device, a media presentation description (MPD) file from a content server, the MPD file describing a media content, the media content comprising a plurality of viewpoints each corresponding to one of a plurality of 360° video camera sets; transmitting, by the client device, a request for a part of the media content based on the MPD file that was received; receiving, by the client device, the part of the media content that was requested; rendering, by the client device, a viewport using the part of the media content that was received, the viewport belonging to one viewpoint from the plurality of viewpoints; and generating, by the client device, a metric containing a viewpoint identifier, the viewpoint identifier identifying the viewpoint that the viewport that was rendered belongs to.

20 Claims, 11 Drawing Sheets

Related U.S. Application Data

(60) Provisional application No. 62/657,324, filed on Apr. 13, 2018.

(51) Int. Cl.

| | | |
|---|---|---|
| *H04N 19/176* | (2014.01) | |
| *H04N 19/186* | (2014.01) | |
| *H04N 19/597* | (2014.01) | |
| *H04N 19/96* | (2014.01) | |
| *H04N 13/344* | (2018.01) | |
| *H04L 67/131* | (2022.01) | |

(52) U.S. Cl.
CPC ......... *H04N 19/119* (2014.11); *H04N 19/176* (2014.11); *H04N 19/186* (2014.11); *H04N 19/597* (2014.11); *H04N 19/96* (2014.11)

(58) Field of Classification Search
CPC .... H04N 19/96; H04N 13/344; H04N 21/816; H04N 21/21805; H04N 21/234345; H04N 21/23439; H04N 21/2662; H04N 21/440245; H04N 21/6587; H04N 21/84; H04N 21/8456; H04N 5/23238; H04L 67/38; G06F 1/163; G06F 1/1694; G06F 3/012; G02B 2027/014; G02B 2027/0187; G02B 2027/0138; G02B 27/017
See application file for complete search history.

(56) References Cited

U.S. PATENT DOCUMENTS

| | | | | |
|---|---|---|---|---|
| 2017/0344843 | A1* | 11/2017 | Wang | ................. G06K 9/00744 |
| 2018/0077210 | A1* | 3/2018 | Hannuksela | ..... H04N 21/47217 |
| 2020/0037029 | A1* | 1/2020 | He | ....................... H04N 21/816 |
| 2021/0152808 | A1* | 5/2021 | He | ........................ H04N 21/84 |

FOREIGN PATENT DOCUMENTS

| | | |
|---|---|---|
| WO | 2015197815 A1 | 12/2015 |
| WO | 2016141165 A1 | 9/2016 |

OTHER PUBLICATIONS

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services—Coding of moving video; High efficiency video coding" Recommendation ITU-T H.265, Apr. 2013, 317 pages.

"Information technology—Coding of audio-visual objects—Part 12: ISO base media file format," ISO/IEC 14496-12, Fifth Edition, Dec. 15, 2015, 248 pages.

Information technology—Coding of audio-visual objects—Part 14: MP4 file format, ISO/IEC 14496-14, Second Edition, Nov. 2018, 22 pages.

InterDigital Communications, Inc. "[MPEG-I] VR metrics for Immersive Media Metrics WD," ISO/IEC JTC1/SC29/WG11 m42454, San Diego, USA, Apr. 2018, 14 pages.

"3rd Generation Partnership Project; Technical Specification Group Services and System Aspects; Transparent end-to-end packet switched streaming service (PSS); 3GPP file format (3GP) (Release 16)," 3GPP TS 26.244, V16.1.0, Sep. 2020, 68 pages.

"Information technology—Coding of audio-visual objects—Part 15: Advanced Video Coding (AVC) file format," ISO/IEC 14496-15, First edition, Apr. 15, 2004, 29 pages.

Huawei Technologies, Co., Ltd., "[OMAF] Support of multiple viewpoints," ISO/IEC JTC1/SC29/WG11 MPEG2018/M42457, San Diego, USA, Apr. 2018, 6 pages.

Systems, "2nd WD of ISO/IEC 23090-6 Immersive Media Metrics," ISO/IEC JTC1/SC29/WG11 N17400, Gwangju, KR, Jan. 2018, 13 pages.

* cited by examiner

0
IMMERSIVE MEDIA METRICS FOR VIRTUAL REALITY CONTENT WITH MULTIPLE VIEWPOINTS

CROSS-REFERENCE TO RELATED APPLICATIONS

This application is a continuation of International Application No. PCT/US2019/018602 filed on Feb. 19, 2019, by Futurewei Technologies, Inc., and titled "Immersive Media Metrics for Virtual Reality Content With Multiple Viewpoints," which claims the benefit of U.S. Provisional Patent Application No. 62/657,324, filed Apr. 13, 2018 by Ye-Kui Wang and titled "Immersive Media Metrics for Virtual Reality Content With Multiple Viewpoints," which is hereby incorporated by reference.

TECHNICAL FIELD

The present disclosure is generally related to virtual reality (VR), also referred to as omnidirectional media, immersive media, and 360 degree video, and is specifically related to immersive media metrics for virtual reality content with multiple viewpoints.

BACKGROUND

Virtual reality (VR) is the ability to be virtually present in a non-physical world created by the rendering of natural and/or synthetic images and sounds correlated by the movements of the immersed user allowing the user to interact with that world. With the recent progress made in rendering devices, such as head mounted displays (HMD) and VR video (often also referred to as 360 degree video or omnidirectional video) creation, a significant quality of experience can be offered. VR applications include gaming, training, education, sports video, online shopping, adult entrainment, and so on.

SUMMARY

A first aspect relates to a method of three hundred and sixty degree (360°) streaming implemented by a client device. The method includes receiving, by the client device, a media presentation description (MPD) file from a content server, the MPD file describing a media content, the media content comprising a plurality of viewpoints each corresponding to one of a plurality of 360° video camera sets; transmitting, by the client device, a request for a part of the media content based on the MPD file that was received; receiving, by the client device, the part of the media content that was requested; rendering, by the client device, a viewport using the part of the media content that was received, the viewport belonging to one viewpoint from the plurality of viewpoints; and generating, by the client device, a metric containing a viewpoint identifier, the viewpoint identifier identifying the viewpoint to which the viewport that was rendered belongs.

A second aspect relates to a method of three hundred and sixty degree (360°) streaming implemented by a content server. The method includes transmitting, by the content server, a media presentation description (MPD) file to a client device, the MPD file describing a media content, the media content comprising a plurality of viewpoints each corresponding to one of a plurality of 360° video camera sets; receiving, by the content server, a request for a part of the media content based on the MPD file that was transmitted; transmitting, by the content server, the part of the media content that was requested; and receiving, by the content server, a metric containing a viewpoint identifier, the viewpoint identifier identifying one viewpoint from the plurality of viewpoints to which a viewport rendered by the client device belongs.

The methods facilitate signaling techniques that improve the signaling of virtual reality content having multiple viewpoints in a video bitstream. The improved signaling enhances the performance of VR video systems, e.g., by indicating or identifying which particular viewpoint from several available viewpoints corresponds to a viewport-related immersive media metric.

In a first implementation form of the method according to the first or second aspect as such, the client device is a head mounted display (HMD).

In a second implementation form of the method according to the first or second aspect as such or any preceding implementation form of the first or second aspect, the content server is a hypertext transport protocol (HTTP) content server or an eXtensible Markup Language (XML) server.

In a third implementation form of the method according to the first or second aspect as such or any preceding implementation form of the first or second aspect, the metric is a rendered viewports metric.

In a fourth implementation form of the method according to the first or second aspect as such or any preceding implementation form of the first or second aspect, the metric is a viewport switching latency metric.

In a fifth implementation form of the method according to the first or second aspect as such or any preceding implementation form of the first or second aspect, the metric is a comparable quality viewport switching latency metric.

In a sixth implementation form of the method according to the first or second aspect as such or any preceding implementation form of the first or second aspect, the metric is a recommended viewport hit metric.

In a seventh implementation form of the method according to the first or second aspect as such or any preceding implementation form of the first or second aspect, the viewpoint identifier comprises a viewpointID entry.

In an eighth implementation form of the method according to the first or second aspect as such or any preceding implementation form of the first or second aspect, the viewport specifies a region of media content that was rendered at presentation time.

In a ninth implementation form of the method according to the first or second aspect as such or any preceding implementation form of the first or second aspect, the media content is virtual reality (VR) media content.

In a tenth implementation form of the method according to the first or second aspect as such or any preceding implementation form of the first or second aspect, the media content is omnidirectional media content.

In an eleventh implementation form of the method according to the first or second aspect as such or any preceding implementation form of the first or second aspect, the metric is a viewport-related immersive media metric.

In a twelfth implementation form of the method according to the first or second aspect as such or any preceding implementation form of the first or second aspect, the viewpoint identifier indicates the one viewpoint that the metric is about.

In a thirteenth implementation form of the method according to the first or second aspect as such or any preceding implementation form of the first or second aspect, the viewpoint identifier comprises an entry of the metric.

In a fourteenth implementation form of the method according to the first or second aspect as such or any preceding implementation form of the first or second aspect, the viewpoint identifier comprises an entry in a key column of the metric.

In a fifteenth implementation form of the method according to the first or second aspect as such or any preceding implementation form of the first or second aspect, the viewpoint identifier comprises an integer.

In a sixteenth implementation form of the method according to the first or second aspect as such or any preceding implementation form of the first or second aspect, the viewpoint identifier comprises an integer in a type column of the metric.

A third aspect relates to a coding apparatus that includes a receiver configured to receive a picture to encode or to receive a bitstream to decode, a transmitter coupled to the receiver, the transmitter configured to transmit the bitstream to a decoder or to transmit a decoded image to a display, a memory coupled to at least one of the receiver or the transmitter, the memory configured to store instructions, and a processor coupled to the memory, the processor configured to execute the instructions stored in the memory to perform the method of any of the preceding aspects or implementations.

The coding apparatus facilitates signaling techniques that improve the signaling of virtual reality content having multiple viewpoints in a video bitstream. The improved signaling enhances the performance of VR video systems, e.g., by indicating or identifying which particular viewpoint from several available viewpoints corresponds to a viewport-related immersive media metric.

In a first implementation form of the apparatus according to the third aspect as such, the apparatus further includes a display configured to display an image.

A fourth aspect relates to a system that includes an encoder and a decoder in communication with the encoder. The encoder or the decoder includes the coding apparatus of any of the preceding aspects or implementations.

The system facilitates signaling techniques that improve the signaling of virtual reality content having multiple viewpoints in a video bitstream. The improved signaling enhances the performance of VR video systems, e.g., by indicating or identifying which particular viewpoint from several available viewpoints corresponds to a viewport-related immersive media metric.

A fifth aspect relates to a means for coding that includes receiving means configured to receive a picture to encode or to receive a bitstream to decode, transmission means coupled to the receiving means, the transmission means configured to transmit the bitstream to a decoder or to transmit a decoded image to a display means, storage means coupled to at least one of the receiving means or the transmission means, the storage means configured to store instructions, and processing means coupled to the storage means, the processing means configured to execute the instructions stored in the storage means to perform the methods in any of the preceding aspects or implementations.

The means for coding facilitates signaling techniques that improve the signaling of virtual reality content having multiple viewpoints in a video bitstream. The improved signaling enhances the performance of VR video systems, e.g., by indicating or identifying which particular viewpoint from several available viewpoints corresponds to a viewport-related immersive media metric.

The features disclosed herein may be utilized to improve the signaling of virtual reality content having multiple viewpoints in a video bitstream. The improved signaling enhances the performance of VR video systems, e.g., by indicating or identifying which particular viewpoint from several available viewpoints corresponds to a viewport-related immersive media metric.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
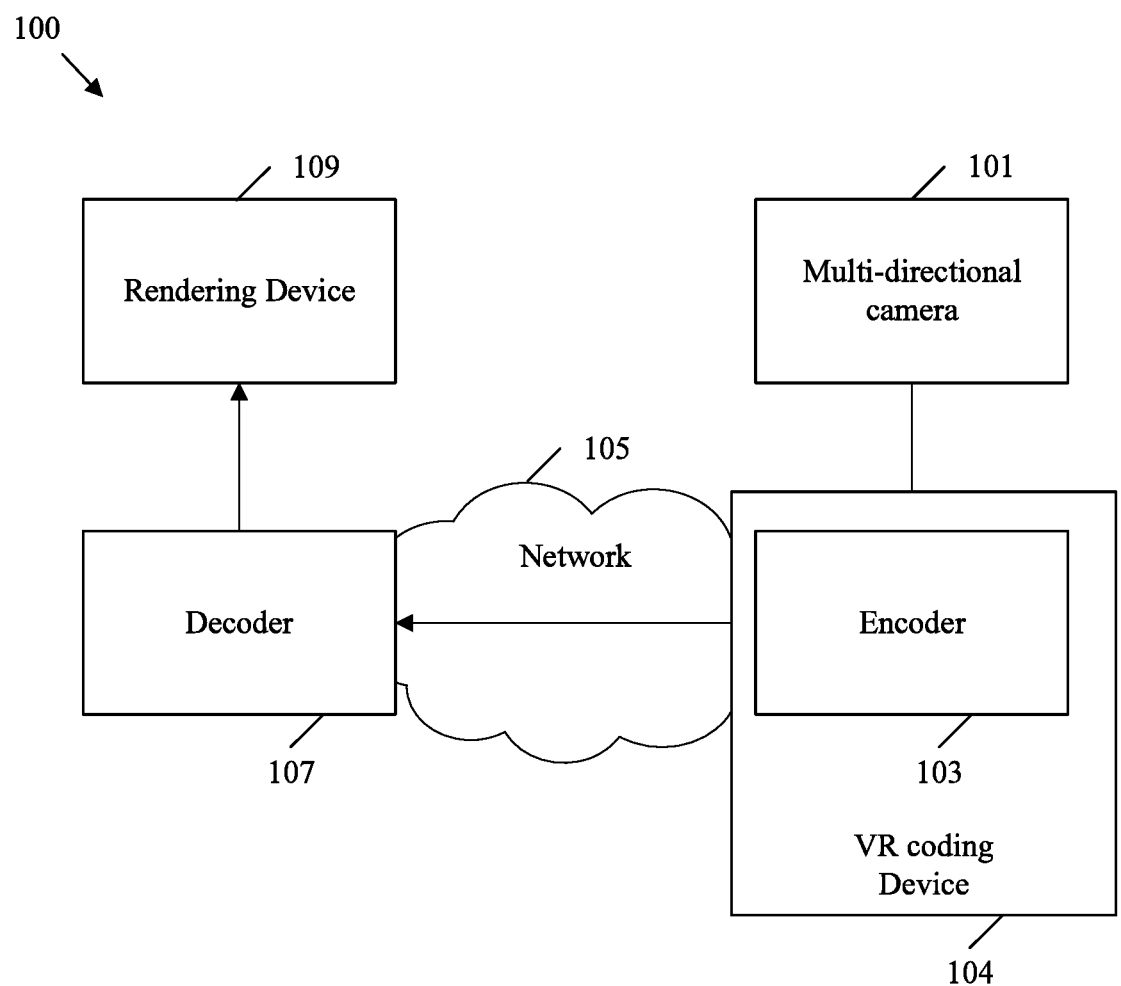
FIG. 1 is a schematic diagram of an example system for VR based video coding.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding standards include International Telecommunication Union Telecommunication Standardization Sector (ITU-T) document H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC).

File format standards include the ISO base media file format (ISOBMFF) (ISO/IEC 14496-12, hereinafter "ISO/IEC 14996-12") and other file format standards derived from ISOBMFF, including MPEG-4 file format (ISO/IEC 14496-14), 3rd Generation Partnership Project (3GPP) file format (3GPP TS 26.244) and AVC file format (ISO/IEC 14496-15, hereinafter "ISO/IEC 14996-15"). Thus, ISO/IEC 14496-12 specifies the ISO base media file format. Other documents extend the ISO base media file format for specific applications. For instance, ISO/IEC 14496-15 describes the carriage of Network Abstraction Layer (NAL) unit structured video in the ISO base media file format. H.264/AVC and HEVC, as well as their extensions, are examples of NAL unit structured video. ISO/IEC 14496-15 includes sections describing the carriage of H.264/AVC NAL units. Additionally, section 8 of ISO/IEC 14496-15 describes the carriage of HEVC NAL units. Thus, section 8 of ISO/IEC 14496-15 is said to describe the HEVC file format.

ISOBMFF is used as the basis for many codec encapsulation formats, such as the AVC File Format, as well as for many multimedia container formats, such as the MPEG-4 File Format, the 3GPP File Format, and the DVB File Format. In addition to continuous media, such as audio and video, static media, such as images, as well as metadata, can be stored in a file conforming to ISOBMFF. Files structured according to ISOBMFF may be used for many purposes, including local media file playback, progressive downloading of a remote file, segments for Dynamic Adaptive Streaming over Hyper Text Transfer Protocol (HTTP) (DASH), containers for content to be streamed and corresponding packetization instructions, and recording of received real-time media streams. Thus, although designed for storage, ISOBMFF can be employed for streaming, e.g., for progressive download or DASH. For streaming purposes, movie fragments defined in ISOBMFF can be used. In addition to continuous media, such as audio and video, static media, such as images, as well as metadata can be stored in a file conforming to ISOBMFF.

A file conforming to the HEVC file format may comprise a series of objects, called boxes. A box may be an object-oriented building block defined by a unique type identifier and length. A box is the elementary syntax structure in ISOBMFF and may include a four-character coded box type, a byte count of the box, and a payload. Accordingly, a box may be a syntax structure comprising a coded box type, a byte count of the box, and a payload. In some instances, all data in a file conforming to the HEVC file format may be contained within boxes and there may be no data in the file that is not in a box. Thus, an ISOBMFF file may include a sequence of boxes, and boxes may contain other boxes. For instance, the payload of a box may include one or more additional boxes.

A file conforming to ISOBMFF may include various types of boxes. For example, a file conforming to ISOBMFF may include a file type box, a media data box, a movie box, a movie fragment box, and so on. In this example, a file type box includes file type and compatibility information. A media data box may contain samples (e.g., coded pictures). A Movie box ("moov") contains metadata for continuous media streams present in the file. Each of the continuous media streams may be represented in the file as a track. For instance, a movie box may contain metadata regarding a movie (e.g., logical and timing relationships between samples, and also pointers to locations of samples). Movie boxes may include several types of sub-boxes. The sub-boxes in a movie box may include one or more track boxes. A track box may include information about an individual track of a movie. A track box may include a track header box that specifies overall information of a single track. In addition, a track box may include a media box that contains a media information box. The media information box may include a sample table box that contains data indexing media samples in the track. Information in the sample table box may be used to locate samples in time and, for each of the samples of the track, a type, size, container, and offset into that container of the sample. Thus, the metadata for a track is enclosed in a Track box ("trak"), while the media content of a track is either enclosed in a Media Data box ("mdat") or directly in a separate file. The media content for tracks comprises or consists of a sequence of samples, such as audio or video access units.

ISOBMFF specifies the following types of tracks: a media track, which contains an elementary media stream, a hint track, which either includes media transmission instructions or represents a received packet stream, and a timed metadata track, which comprises time-synchronized metadata. The metadata for each track includes a list of sample description entries, each providing the coding or encapsulation format used in the track and the initialization data used for processing that format. Each sample is associated with one of the sample description entries of the track.

ISOBMFF enables specifying sample-specific metadata with various mechanisms. Specific boxes within the Sample Table box ("stbl") have been standardized to respond to common uses. The Sample Table box contains a sample table that contains all the time and data indexing of the media samples in a track. Using the tables in the Sample Table box, a system may locate samples in time, determine their type (e.g., I-frame or not), and determine their size, container, and offset into that container.

A Movie Fragment box is a top-level box. Each Movie Fragment box provides information similar to that of a Movie box. A Movie Fragment box may contain one or more track fragment ("traf") boxes. Within the Movie Fragment there is a set of track fragments, zero or more per track. The track fragments in turn contain zero or more track runs, each of which documents a contiguous run of samples for that track. For instance, each track run may contain samples of pictures that are contiguous in a certain order, such as decoding order. A track fragment box is defined in the ISO/IEC 14996-12 specification and comprises metadata for one or more track fragments. For instance, a track fragment box may include a track fragment header box indicating a track identifier (ID), a base data offset, a sample description index, a default sample duration, a default sample size, and default sample flags. A track fragment box may include one or more track fragment run boxes, each documenting a contiguous set of samples for a track. For instance, a track fragment box may include syntax elements indicating a sample count, a data offset, sample flags, a sample duration, a sample size, sample composition time offset, and so on. Within these structures, many fields are optional and can be defaulted.

Dynamic adaptive streaming over HTTP (DASH), specified in ISO/IEC 23009-1, is a standard for HTTP (adaptive) streaming applications. DASH mainly specifies the format of the media presentation description (MPD), also known as manifest or an MPD file, and the media segment format. The MPD describes the media available on the server and allows the DASH client to autonomously download the media version at the media time that the client is interested in.

DASH employs a hierarchical data model. A presentation is described by an MPD document that describes the sequence of periods in time that make up the media presentation. A period typically represents a media content period during which a consistent set of encoded versions of the media content is available, e.g., the set of available bitrates, languages, captions, subtitles, etc. does not change during a period.

Within a period, material is arranged into adaptation sets. An adaptation set represents a set of interchangeable encoded versions of one or several media content components. For example, there may be one adaptation set for the main video component and a separate adaptation set for the main audio component. Other available material, such as captions or audio descriptions, may each have a separate adaptation set. Material may also be provided in multiplexed form, in which case interchangeable versions of the multiplex may be described as a single adaptation set. For example an adaptation set may contain both the main audio and main video for a period. Each of the multiplexed components may be described individually by a media content component description.

An adaptation set contains a set of representations. A representation describes a deliverable encoded version of one or several media content components. A representation includes one or more media streams (one for each media content component in the multiplex). Any single representation within an adaptation set is sufficient to render the contained media content components. By collecting different representations in one adaptation set, the media presentation author expresses that the representations represent perceptually equivalent content. Typically, this means that clients may switch dynamically from representation to representation within an adaptation set in order to adapt to network conditions or other factors. Switching refers to the presentation of decoded data up to a certain time t, and presentation of decoded data of another representation from time t onwards. If representations are included in one Adaptation Set, and the client switches properly, the media presentation is expected to be perceived seamlessly across the switch. Clients may ignore representations that rely on codecs or other rendering technologies they do not support or that are otherwise unsuitable. Within a representation, the content may be divided in time into segments for proper accessibility and delivery. In order to access a segment, a Universal Resource Locator (URL) is provided for each segment. Consequently, a segment is the largest unit of data that can be retrieved with a single HTTP request by a DASH client.

An example procedure for DASH based HTTP streaming includes the following steps. First, a client obtains the MPD of a streaming content, e.g., a movie. The MPD includes information on different alternative representations, such as bitrate, video resolution, frame rate, and/or audio language of the streaming content, as well as the URLs of the HTTP resources (the initialization segment and the media segments). Second, the client requests the desired representation(s), one segment (or a part thereof) at a time. Such requests are based on information in the MPD and the client's local information, which may include network bandwidth, decoding/display capabilities, and user preference. Third, the client requests segments of a different representation with a better-matching bitrate when the client detects a network bandwidth change. The request should ideally start from a segment that starts with a random access point.

During an HTTP streaming session, the client may request past or future segments starting from a segment that is close to the desired position and that ideally starts with a random access point. This may occur when a user requests to seek backward to a past position or forward to a future position in the media content. The user may also request to fast-forward the content, which may be realized by requesting data sufficiently for decoding only the intra-coded video pictures or only a temporal subset of the video stream. Annex D of the DASH specification specifies DASHs metrics.

Virtual reality (VR) describes a system's ability to provide the impression that a user is virtually present in a non-physical world created by the rendering of natural and/or synthetic image and sound correlated by the movements of the immersed user, which allows the user to interact with that world. Rendering devices, such as head mounted displays (HMD), and VR video (often also referred to as three hundred sixty degree video or omnidirectional video) offer a significant quality of experience. VR applications include gaming, training, education, sports video, online shopping, adult entrainment, and so on.

In normal video applications, the entire video region is displayed. A distinct feature of VR video compared to normal video applications is that typically only a subset of the entire video region represented by the video pictures is displayed to the user in VR. This subset corresponds to the user's current field of view (FOV) (e.g., the area or region currently being seen by the user). FOV is sometimes also referred to as a viewport. By using viewport dependent projection mapping or viewport dependent video coding, the performance of VR video systems may be improved. The performance improvement can be either or both of lower transmission bandwidth and lower decoding complexity compared to other VR video systems under the same resolution/quality of the video part presented to the user.

Disclosed herein are signaling techniques and/or methods that improve the signaling of virtual reality content having multiple viewpoints in a video bitstream. The improved signaling enhances the performance of VR video systems, e.g., by indicating or identifying which particular viewpoint from several available viewpoints corresponds to a viewport-related immersive media metric.

FIG. 1 is a schematic diagram of an example system 100 for VR based video coding. System 100 includes a multi-directional camera 101, a VR coding device 104 including an encoder 103, a decoder 107, and a rendering device 109. The multi-directional camera 101 comprises an array of camera devices. Each camera device is pointed at a different angle so that the multi-directional camera 101 can take multiple directional video streams of the surrounding environment from a plurality of angles. For example, multi-directional camera 101 can take video of the environment as a sphere with the multi-directional camera 101 at the center of the sphere. As used herein, sphere and spherical video refers to both a geometrical sphere and sub-portions of a geometrical sphere, such as spherical caps, spherical domes, spherical segments, etc. For example, a multi-directional camera 101 may take one hundred and eighty degree video to cover half of the environment so that a production crew can remain behind the multi-directional camera 101. A multi-directional camera 101 can also take video in three hundred sixty degrees (or any sub-portion thereof). However, a portion of the floor under the multi-directional camera 101 may be omitted, which results in video of less than a perfect sphere. Hence, the term sphere, as used herein, is a general term used for clarity of discussion and should not be considered limiting from a geometrical stand point.

Video from the multi-directional camera 101 is forwarded to the VR coding device 104. A VR coding device 104 may be a computing system including specialized VR coding software. The VR coding device 104 may include an encoder 103 (a.k.a., a video encoder). In some examples, the encoder 103 can also be included in a separate computer system from the VR coding device 104. The VR coding device 104 is configured to convert the multiple directional video streams into a single multiple directional video stream including the entire recorded area from all relevant angles. This conversion may be referred to as image stitching. For example, frames from each video stream that are captured at the same time can be stitched together to create a single spherical image. A spherical video stream can then be created from the spherical images. For clarity of discussion, it should be noted that the terms frame, picture, and image may be interchangeably herein unless specifically noted.

The spherical video stream can then be forwarded to the encoder 103 for compression. An encoder 103 is a device and/or program capable of converting information from one format to another for purposes of standardization, speed, and/or compression. Standardized encoders 103 are configured to encode rectangular and/or square images. Accordingly, the encoder 103 is configured to map each spherical image from the spherical video stream into a plurality of rectangular sub-pictures. The sub-pictures can then be placed in separate sub-picture video streams. As such, each sub-picture video stream displays a stream of images over time as recorded from a sub-portion of the spherical video stream. The encoder 103 can then encode each sub-picture video stream to compress the video stream to a manageable file size. The encoding process is discussed in more detail below. In general, the encoder 103 partitions each frame from each sub-picture video stream into pixel blocks, compresses the pixel blocks by inter-prediction and/or intra-prediction to create coding blocks including prediction blocks and residual blocks, applies transforms to the residual blocks for further compression, and applies various filters to the blocks. The compressed blocks as well as corresponding syntax are stored in bitstream(s), for example in ISOBMFF and/or in omnidirectional media format (OMAF).

The VR coding device 104 may store the encoded bitstream(s) in memory, locally, and/or on a server, for communication to a decoder 107 on demand. The data can be forwarded via a network 105, which may include the Internet, a mobile telecommunications network (e.g., a long term evolution (LTE) based data network), or other data communication data system.

The decoder 107 (a.k.a., a video decoder) is a device on a user's location that is configured to reverse the coding process to reconstruct the sub-picture video streams from the encoded bitstream(s). The decoder 107 also merges the sub-picture video streams to reconstruct the spherical video stream. The spherical video stream, or sub-portions thereof, can then be forwarded to the rendering device 109. The rendering device 109 is a device configured to display the spherical video stream to the user. For example, the rendering device 109 may include a HMD that attaches to the user's head and covers the user's eyes. The rendering device may include a screen for each eye, cameras, motion sensors, speakers, etc. and may communicate with the decoder 107 via wireless and/or wired connections. The rendering device 109 may display a sub-portion of the spherical video stream to the user. The sub-portion shown is based on the FOV and/or viewport of the rendering device 109. For example, the rendering device 109 may change the position of the FOV based on user head movement by employing the motion tracking sensors. This allows the user to see different portions of the spherical video stream depending on head movement. Further, the rendering device 109 may offset the FOV for each eye based on the user's interpapillary distance (IPD) to create the impression of a three dimensional space.

Figure 2:
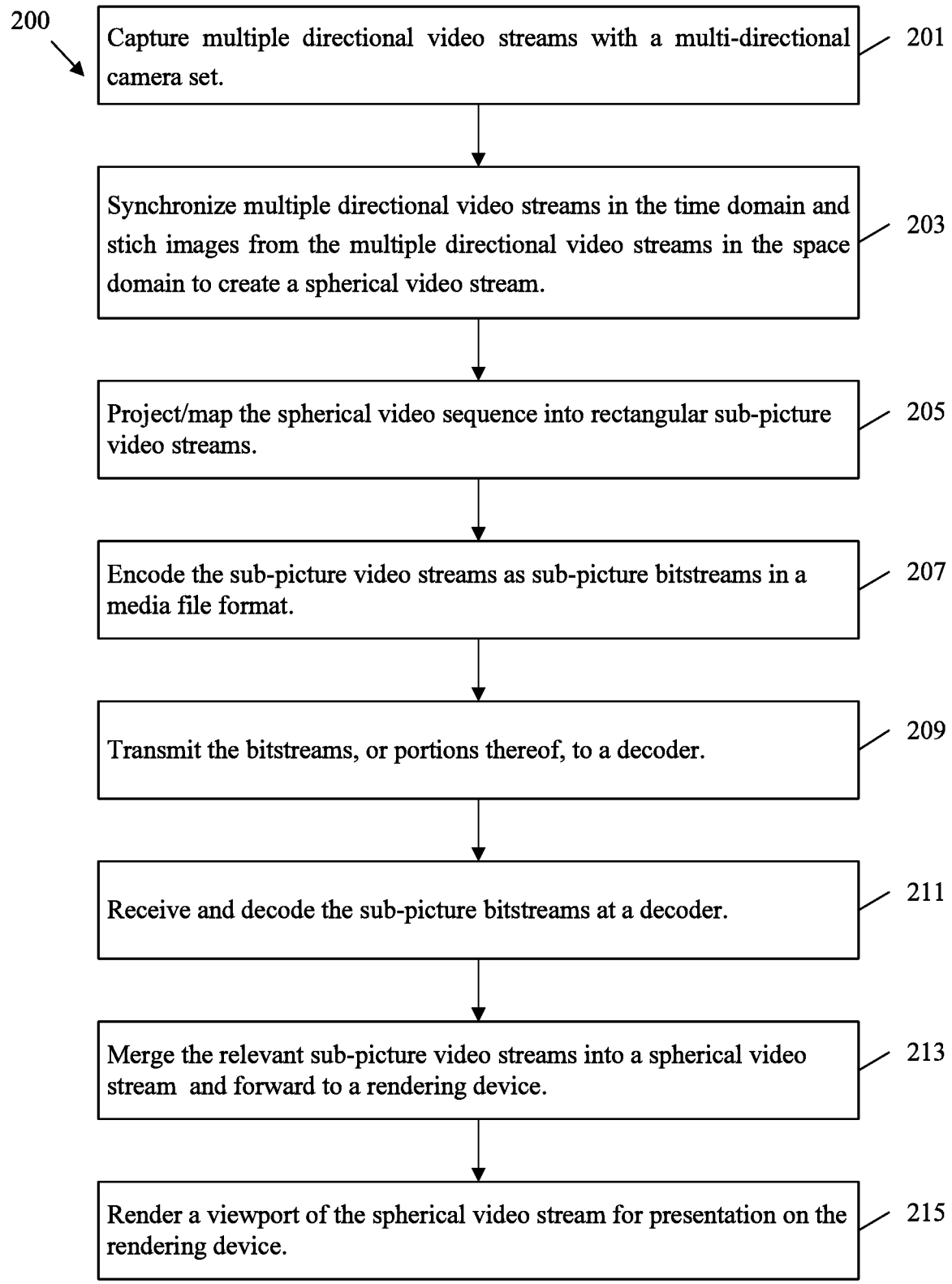
FIG. 2 is a flowchart of an example method of coding a VR picture bitstream.

FIG. 2 is a flowchart of an example method 200 of coding a VR picture bitstream as a plurality of sub-picture bitstreams, for example by employing the components of system 100. At step 201, multi-directional camera set, such as multi-directional camera 101, is used to capture multiple directional video streams. The multiple directional video streams include views of an environment at various angles. For example, the multiple directional video streams may capture video from three hundred sixty degrees, one hundred eighty degrees, two hundred forty degrees, etc. around the camera in the horizontal plane. The multiple directional video streams may also capture video from three hundred sixty degrees, one hundred eighty degrees, two hundred forty degrees, etc. around the camera in the vertical plane. The result is to create video that includes information sufficient to cover a spherical area around the camera over some period of time.

At step 203, the multiple directional video streams are synchronized in the time domain. Specifically, each directional video stream includes a series of images taken at a corresponding angle. The multiple directional video streams are synchronized by ensuring frames from each directional video stream that were captured at the same time domain position are processed together. The frames from the directional video streams can then be stitched together in the space domain to create a spherical video stream. Hence, each frame of the spherical video stream contains data taken from the frames of all the directional video streams that occur at a common temporal position.

At step 205, the spherical video stream is mapped into rectangular sub-picture video streams. This process may also be referred to as projecting the spherical video stream into rectangular sub-picture video streams. As noted above, encoders and decoders are generally designed to encode rectangular and/or square frames. Accordingly, mapping the spherical video stream into rectangular sub-picture video streams creates video streams that can be encoded and decoded by non-VR specific encoders and decoders, respectively. It should be noted that steps 203 and 205 are specific to VR video processing, and hence may be performed by specialized VR hardware, software, or combinations thereof.

At step 207, the rectangular sub-picture video streams can be forwarded to an encoder, such as encoder 103. The encoder then encodes the sub-picture video streams as sub-picture bitstreams in a corresponding media file format. Specifically, each sub-picture video stream can be treated by the encoder as a video signal. The encoder can encode each frame of each sub-picture video stream via inter-prediction, intra-prediction, etc. Such encoding and corresponding decoding as well as encoders and decoders are discussed in detail with respect to FIGS. 3-11 below. Regarding file format, the sub-picture video streams can be stored in ISOBMFF. For example, the sub-picture video streams are captured at a specified resolution. The sub-picture video streams can then be downsampled to various lower resolutions for encoding. Each resolution can be referred to as a representation. Lower quality representations lose image clarity while reducing file size. Accordingly, lower quality representations can be transmitted to a user using fewer network resources (e.g., time, bandwidth, etc.) than higher quality representations with an attendant loss of visual quality. Each representation can be stored in a corresponding set of tracks. Hence, tracks can be sent to a user, where the tracks include the sub-picture bitstreams at various resolutions (e.g., visual quality).

At step 209, the sub-picture bitstreams can be sent to the decoder as tracks. In some examples, all sub-picture bitstreams are transmitted at the same quality by transmitting tracks from the same representation. The downside to this approach is that areas of the final VR video stream that are of less concern are transmitted at the same resolution as all other areas. Viewport dependent coding can be used to improve compression over such an approach. In viewport dependent coding, the tracks containing sub-picture bitstreams with data in the users FOV are sent at higher resolutions by selecting higher quality representations. Tracks containing sub-picture bitstreams with areas outside the users FOV can be sent at progressively lower resolutions by selecting lower quality representations. Some areas may even be completely omitted in some examples. For example, areas adjacent to the FOV can be sent at slightly reduced quality in case the user decided to change the FOV to include such areas. Areas farther away from the FOV can be sent at progressively lower quality as such areas are progressively more unlikely to enter the FOV and hence are progressively more unlikely to ever be rendered for the user. The tracks may include relatively short video segments (e.g., about three seconds), and hence the representations selected for particular areas of the video can change over time based on changes in FOV. This allows quality to change as the users FOV changes. Viewport dependent coding may significantly reduce the file size of the tracks sent to the user without significant losses in visual quality because the areas of reduced quality are unlikely to be seen by the user.

At step 211, a decoder, such as decoder 107, receives the tracks containing the sub-picture bitstreams. The decoder can then decode the sub-picture bitstreams into sub-picture video streams for display. The decoding process involves the reverse of the encoding process (e.g., using inter-prediction and intra-prediction), and is discussed in more detail with respect to FIGS. 3-11 below.

At step 213, the decoder can merge the sub-picture video streams into the spherical video stream for presentation to the user. Specifically, the decoder can employ a so called lightweight merging algorithm that selects frames from each sub-picture video stream that occur at the same presentation time and merges them together based on the position and/or angle associated with the corresponding sub-picture video stream. The decoder may also employ filters to smooth edges between the sub-picture video streams, remove artifacts, etc. The decoder can then forward the spherical video stream to a rendering device, such as rendering device 109.

At step 215, the rendering device renders a viewport of the spherical video stream for presentation to the user. As mentioned above, areas of the spherical video stream outside of the FOV at each point in time are not rendered. Hence, in viewport dependent coding, lower quality representations are effectively omitted, and hence the reduction in viewing quality has a negligible impact on user experience while reducing file size.

Figure 3:
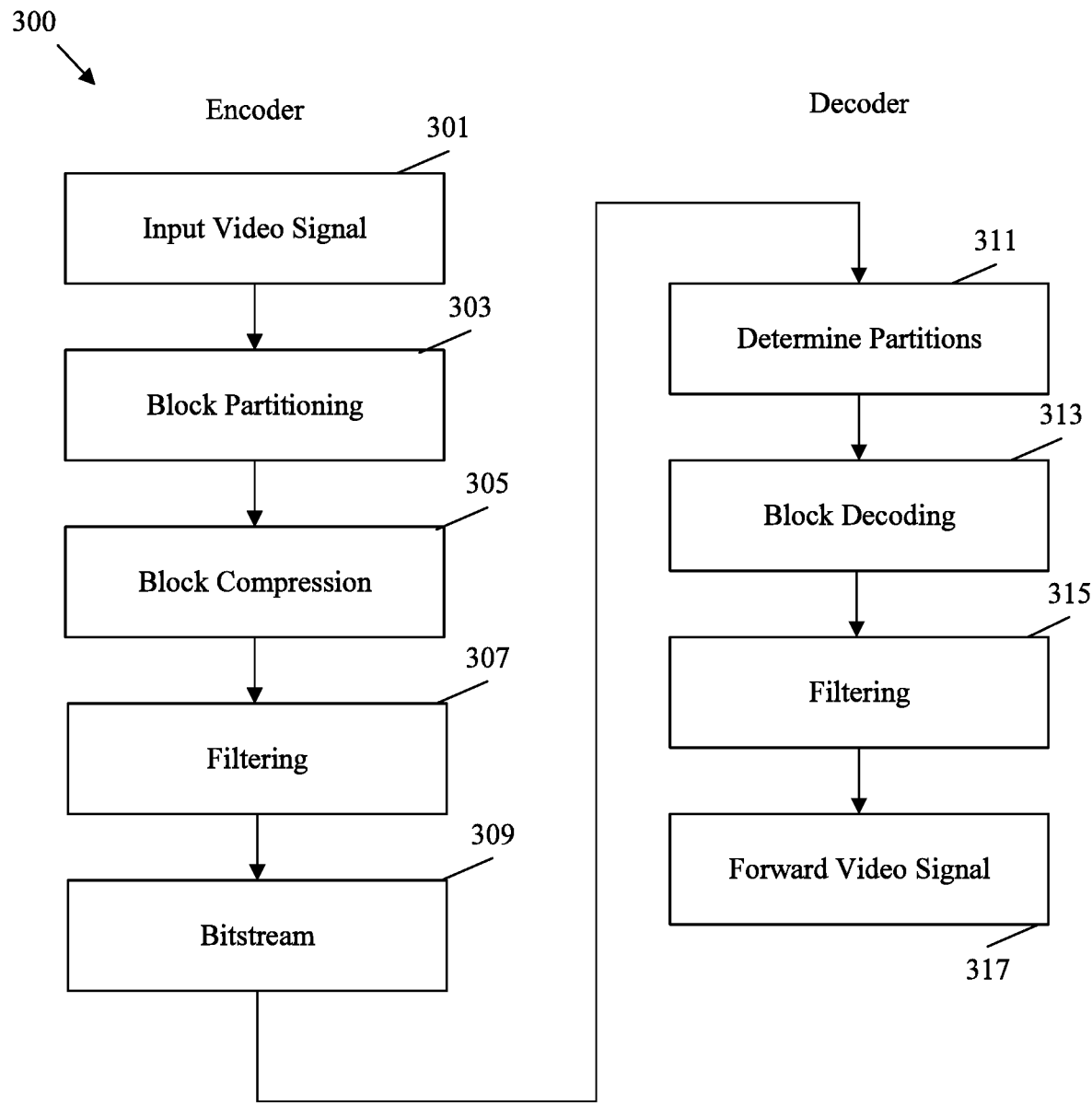
FIG. 3 is a flowchart of an example method of coding a video signal.

FIG. 3 is a flowchart of an example method 300 of coding a video signal including a sub-picture video stream. For example, method 300 may receive a plurality of sub-picture video streams from step 205 of method 200. Method 300 treats each sub-picture video stream as a video signal input. Method 300 applies steps 301-317 to each sub-picture video stream in order to implement steps 207-211 of method 200. Hence, the output video signal from method 300 includes the decoded sub-picture video streams, which can be merged and displayed according to steps 213 and 215 of method 200.

Method 300 encodes a video signal, for example including sub-picture video streams, at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 301, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples).

At step 303, the video signal is partitioned into blocks. Partitioning includes subdividing the pixels in each frame into square and/or rectangular blocks for compression. For example, in HEVC (also known as H.265 and MPEG-H Part 2) the frame can first be divided into coding tree units (CTUs), which are blocks of a predefined size (e.g., sixty four pixels by sixty four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 305, various compression mechanisms are employed to compress the image blocks partitioned at step 303. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement, or lack thereof. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 307, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 309. The bitstream includes the data discussed above as well as any signaling data (e.g., syntax) desired to support proper video signal reconstruction at the decoder. For example, such data may include partition data, prediction data, residual blocks, and various flags providing coding instructions to the decoder. The bitstream may be stored in memory for transmission toward a decoder upon request, for example as a track and/or track fragment in ISOBMFF. The bitstream may also be broadcast and/or multicast toward a plurality of decoders. The creation of the bitstream is an iterative process. Accordingly, steps 301, 303, 305, 307, and 309 may occur continuously and/or simultaneously over many frames and blocks. The order shown in FIG. 3 is presented for clarity and ease of discussion, and is not intended to limit the video coding process to a particular order.

The decoder receives the bitstream and begins the decoding process at step 311. For example, the decoder can employ an entropy decoding scheme to convert the bitstream into corresponding syntax and video data. The decoder employs the syntax data from the bitstream to determine the partitions for the frames at step 311. The partitioning should match the results of block partitioning at step 303. Entropy encoding/decoding, which may be employed in step 311, is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.). The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 313, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 305. The reconstructed image blocks are then positioned into frames of a reconstructed video signal according to the partitioning data determined at step 311. Syntax for step 313 may also be signaled in the bitstream via entropy coding as discussed above.

At step 315, filtering is performed on the frames of the reconstructed video signal in a manner similar to step 307 at the encoder. For example, noise suppression filters, de-blocking filters, adaptive loop filters, and SAO filters may be applied to the frames to remove blocking artifacts. Once the frames are filtered, the video signal can be forwarded for merging at step 317 and then output to a display, such as a HMD, for viewing by an end user.

Figure 4:
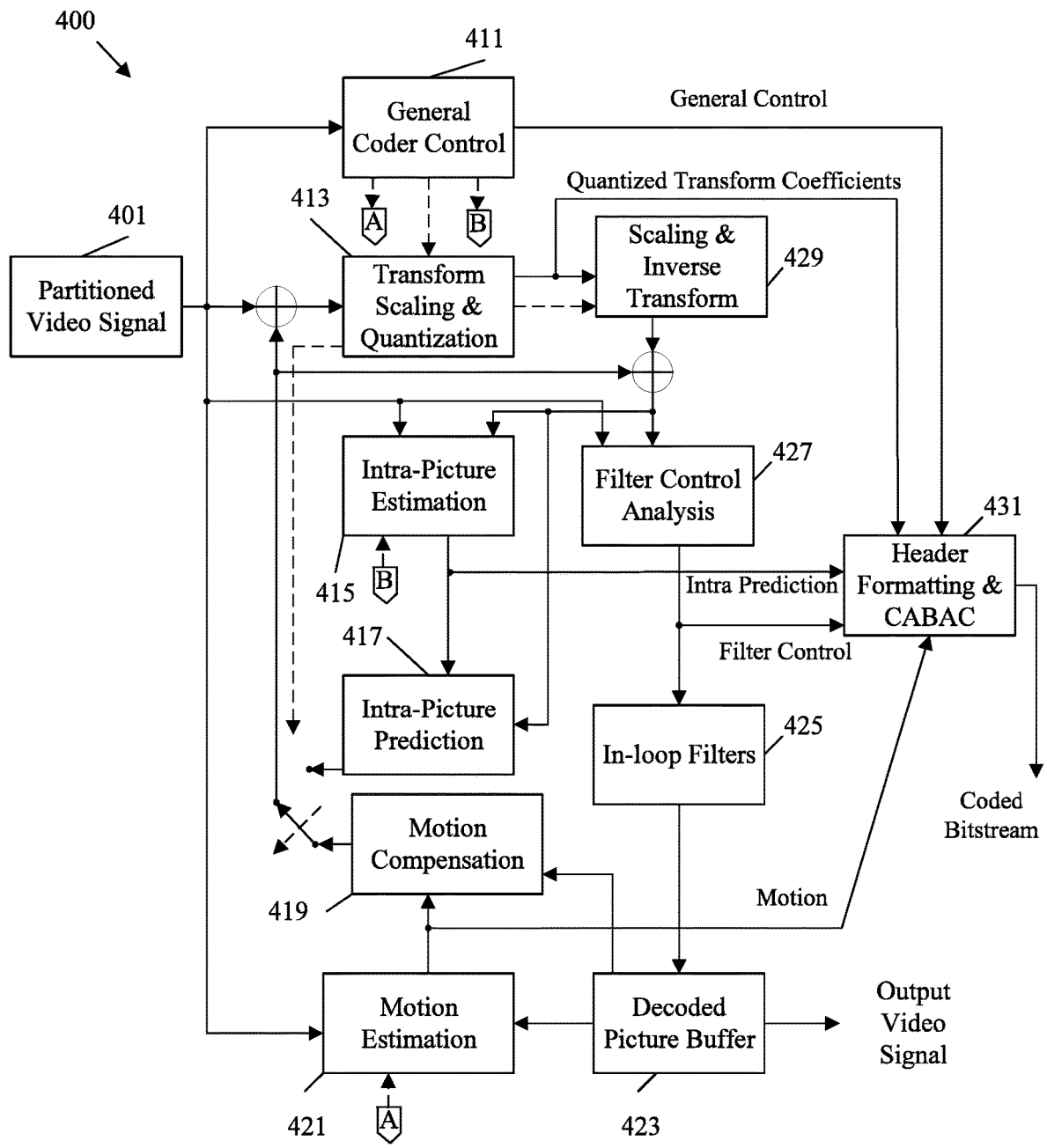
FIG. 4 is a schematic diagram of an example coding and decoding (codec) system for video coding.

FIG. 4 is a schematic diagram of an example coding and decoding (codec) system 400 for video coding. Specifically, codec system 400 provides functionality to support encoding and decoding sub-picture video streams according to methods 200 and 300. Further, codec system 400 can be employed to implement an encoder 103 and/or a decoder 107 of system 100.

Codec system 400 is generalized to depict components employed in both an encoder and a decoder. Codec system 400 receives and partitions frames form a video signal (e.g., including a sub-picture video stream) as discussed with respect to steps 301 and 303 in operating method 300, which results in a partitioned video signal 401. Codec system 400 then compresses the partitioned video signal 401 into a coded bitstream when acting as an encoder as discussed with respect to steps 305, 307, and 309 in method 300. When acting as a decoder, codec system 400 generates an output video signal from the bitstream as discussed with respect to steps 311, 313, 315, and 317 in operating method 300. The codec system 400 includes a general coder control component 411, a transform scaling and quantization component 413, an intra-picture estimation component 415, an intra-picture prediction component 417, a motion compensation component 419, a motion estimation component 421, a scaling and inverse transform component 429, a filter control analysis component 427, an in-loop filters component 425, a decoded picture buffer component 423, and a header formatting and context adaptive binary arithmetic coding (CABAC) component 431. Such components are coupled as shown. In FIG. 4, black lines indicate movement of data to be encoded/decoded while dashed lines indicate movement of control data that controls the operation of other components. The components of codec system 400 may all be present in the encoder. The decoder may include a subset of the components of codec system 400. For example, the decoder may include the intra-picture prediction component 417, the motion compensation component 419, the scaling and inverse transform component 429, the in-loop filters component 425, and the decoded picture buffer component 423. These components are now described.

The partitioned video signal 401 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 401 is forwarded to the general coder control component 411, the transform scaling and quantization component 413, the intra-picture estimation component 415, the filter control analysis component 427, and the motion estimation component 421 for compression.

The general coder control component 411 is configured to make decisions related to coding of the images of the video sequence into the bitstream according to application constraints. For example, the general coder control component 411 manages optimization of bitrate/bitstream size versus reconstruction quality. Such decisions may be made based on storage space/bandwidth availability and image resolution requests. The general coder control component 411 also manages buffer utilization in light of transmission speed to mitigate buffer underrun and overrun issues. To manage these issues, the general coder control component 411 manages partitioning, prediction, and filtering by the other components. For example, the general coder control component 411 may dynamically increase compression complexity to increase resolution and increase bandwidth usage or decrease compression complexity to decrease resolution and bandwidth usage. Hence, the general coder control component 411 controls the other components of codec system 400 to balance video signal reconstruction quality with bitrate concerns. The general coder control component 411 creates control data, which controls the operation of the other components. The control data is also forwarded to the header formatting and CABAC component 431 to be encoded in the bitstream to signal parameters for decoding at the decoder.

The partitioned video signal 401 is also sent to the motion estimation component 421 and the motion compensation component 419 for inter-prediction. A frame or slice of the partitioned video signal 401 may be divided into multiple video blocks. Motion estimation component 421 and the motion compensation component 419 perform inter-predictive coding of the received video block relative to one or more blocks in one or more reference frames to provide temporal prediction. Codec system 400 may perform multiple coding passes, e.g., to select an appropriate coding mode for each block of video data.

Motion estimation component 421 and motion compensation component 419 may be highly integrated, but are illustrated separately for conceptual purposes. Motion estimation, performed by motion estimation component 421, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 421 generates motion vectors, PUs, and TUs by using a rate-distortion analysis as part of a rate distortion optimization process. For example, the motion estimation component 421 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 400 may calculate values for sub-integer pixel positions of reference pictures stored in decoded picture buffer component 423. For example, video codec system 400 may interpolate values of one-quarter pixel positions, one-eighth pixel positions, or other fractional pixel positions of the reference picture. Therefore, motion estimation component 421 may perform a motion search relative to the full pixel positions and fractional pixel positions and output a motion vector with fractional pixel precision. The motion estimation component 421 calculates a motion vector for a PU of a video block in an inter-coded slice by comparing the position of the PU to the position of a predictive block of a reference picture. Motion estimation component 421 outputs the calculated motion vector as motion data to the header formatting and CABAC component 431 for encoding and motion to the motion compensation component 419.

Motion compensation, performed by motion compensation component 419, may involve fetching or generating the predictive block based on the motion vector determined by motion estimation component 421. Again, motion estimation component 421 and motion compensation component 419 may be functionally integrated, in some examples. Upon receiving the motion vector for the PU of the current video block, motion compensation component 419 may locate the predictive block to which the motion vector points. A residual video block is then formed by subtracting pixel values of the predictive block from the pixel values of the current video block being coded, forming pixel difference values. In general, motion estimation component 421 performs motion estimation relative to luma components, and motion compensation component 419 uses motion vectors calculated based on the luma components for both chroma components and luma components. The predictive block and residual block are forwarded to transform scaling and quantization component 413.

The partitioned video signal 401 is also sent to intra-picture estimation component 415 and intra-picture prediction component 417. As with motion estimation component 421 and motion compensation component 419, intra-picture estimation component 415 and intra-picture prediction component 417 may be highly integrated, but are illustrated separately for conceptual purposes. The intra-picture estimation component 415 and intra-picture prediction component 417 intra-predict a current block relative to blocks in a current frame, as an alternative to the inter-prediction performed by motion estimation component 421 and motion compensation component 419 between frames, as described above. In particular, the intra-picture estimation component 415 determines an intra-prediction mode to use to encode a current block. In some examples, intra-picture estimation component 415 selects an appropriate intra-prediction mode to encode a current block from multiple tested intra-prediction modes. The selected intra-prediction modes are then forwarded to the header formatting and CABAC component 431 for encoding.

For example, the intra-picture estimation component 415 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 415 calculates ratios from the distortions and rates for the various encoded blocks to determine which intra-prediction mode exhibits the best rate-distortion value for the block. In addition, intra-picture estimation component 415 may be configured to code depth blocks of a depth map using a depth modeling mode (DMM) based on rate-distortion optimization (RDO).

The intra-picture prediction component 417 may generate a residual block from the predictive block based on the selected intra-prediction modes determined by intra-picture estimation component 415 when implemented on an encoder or read the residual block from the bitstream when implemented on a decoder. The residual block includes the difference in values between the predictive block and the original block, represented as a matrix. The residual block is then forwarded to the transform scaling and quantization component 413. The intra-picture estimation component 415 and the intra-picture prediction component 417 may operate on both luma and chroma components.

The transform scaling and quantization component 413 is configured to further compress the residual block. The transform scaling and quantization component 413 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms, or other types of transforms could also be used. The transform may convert the residual information from a pixel value domain to a transform domain, such as a frequency domain. The transform scaling and quantization component 413 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 413 is also configured to quantize the transform coefficients to further reduce bitrate. The quantization process may reduce the bit depth associated with some or all of the coefficients. The degree of quantization may be modified by adjusting a quantization parameter. In some examples, the transform scaling and quantization component 413 may then perform a scan of the matrix including the quantized transform coefficients. The quantized transform coefficients are forwarded to the header formatting and CABAC component 431 to be encoded in the bitstream.

The scaling and inverse transform component 429 applies a reverse operation of the transform scaling and quantization component 413 to support motion estimation. The scaling and inverse transform component 429 applies inverse scaling, transformation, and/or quantization to reconstruct the residual block in the pixel domain, e.g., for later use as a reference block which may become a predictive block for another current block. The motion estimation component 421 and/or motion compensation component 419 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 427 and the in-loop filters component 425 apply the filters to the residual blocks and/or to reconstructed image blocks. For example, the transformed residual block from the scaling and inverse transform component 429 may be combined with a corresponding prediction block from intra-picture prediction component 417 and/or motion compensation component 419 to reconstruct the original image block. The filters may then be applied to the reconstructed image block. In some examples, the filters may instead be applied to the residual blocks. As with other components in FIG. 4, the filter control analysis component 427 and the in-loop filters component 425 are highly integrated and may be implemented together, but are depicted separately for conceptual purposes. Filters applied to the reconstructed reference blocks are applied to particular spatial regions and include multiple parameters to adjust how such filters are applied. The filter control analysis component 427 analyzes the reconstructed reference blocks to determine where such filters should be applied and sets corresponding parameters. Such data is forwarded to the header formatting and CABAC component 431 as filter control data for encoding. The in-loop filters component 425 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 423 for later use in motion estimation as discussed above. When operating as a decoder, the decoded picture buffer component 423 stores and forwards the reconstructed and filtered blocks toward a display as part of an output video signal. The decoded picture buffer component 423 may be any memory device capable of storing prediction blocks, residual blocks, and/or reconstructed image blocks.

The header formatting and CABAC component 431 receives the data from the various components of codec system 400 and encodes such data into a coded bitstream for transmission toward a decoder. Specifically, the header formatting and CABAC component 431 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 401. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 5:
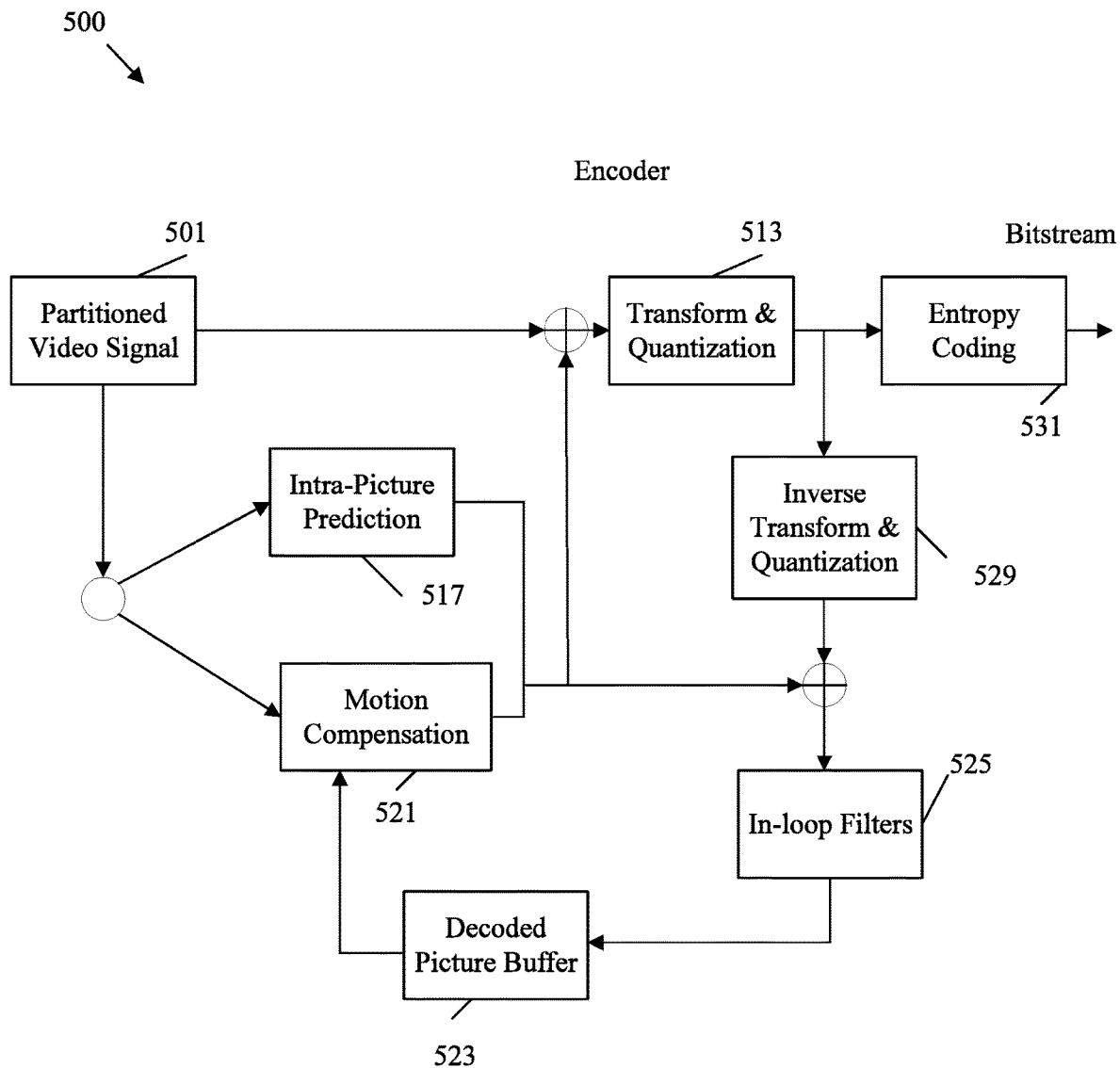
FIG. 5 is a schematic diagram illustrating an example video encoder.

FIG. 5 is a block diagram illustrating an example video encoder 500 that may encode sub-picture bitstreams. Video encoder 500 may be employed to implement the encoding functions of codec system 400 and/or implement steps 301, 303, 305, 307, and/or 309 of method 300. Further, encoder 500 may be employed to implement steps 205-209 of method 200 as well as encoder 103. Encoder 500 partitions an input video signal (e.g., a sub-picture video stream), resulting in a partitioned video signal 501, which is substantially similar to the partitioned video signal 401. The partitioned video signal 501 is then compressed and encoded into a bitstream by components of encoder 500.

Specifically, the partitioned video signal 501 is forwarded to an intra-picture prediction component 517 for intra-prediction. The intra-picture prediction component 517 may be substantially similar to intra-picture estimation component 415 and intra-picture prediction component 417. The partitioned video signal 501 is also forwarded to a motion compensation component 521 for inter-prediction based on reference blocks in a decoded picture buffer component 523. The motion compensation component 521 may be substantially similar to motion estimation component 421 and motion compensation component 419. The prediction blocks and residual blocks from the intra-picture prediction component 517 and the motion compensation component 521 are forwarded to a transform and quantization component 513 for transformation and quantization of the residual blocks. The transform and quantization component 513 may be substantially similar to the transform scaling and quantization component 413. The transformed and quantized residual blocks and the corresponding prediction blocks (along with associated control data) are forwarded to an entropy coding component 531 for coding into a bitstream. The entropy coding component 531 may be substantially similar to the header formatting and CABAC component 431.

The transformed and quantized residual blocks and/or the corresponding prediction blocks are also forwarded from the transform and quantization component 513 to an inverse transform and quantization component 529 for reconstruction into reference blocks for use by the motion compensation component 521. The inverse transform and quantization component 529 may be substantially similar to the scaling and inverse transform component 429. In-loop filters in an in-loop filters component 525 are also applied to the residual blocks and/or reconstructed reference blocks, depending on the example. The in-loop filters component 525 may be substantially similar to the filter control analysis component 427 and the in-loop filters component 425. The in-loop filters component 525 may include multiple filters as discussed with respect to in-loop filters component 425. The filtered blocks are then stored in a decoded picture buffer component 523 for use as reference blocks by the motion compensation component 521. The decoded picture buffer component 523 may be substantially similar to the decoded picture buffer component 423.

The encoder 500 receives sub-picture video streams split from a spherical video stream for use in conjunction with a VR system using viewport dependent coding. As noted above, when sub-picture video streams are transmitted to a decoder at varying resolutions, artifacts can occur due to data lost in the process of reducing resolutions for the lower quality sub-picture video streams. This is because both intra-prediction and inter-prediction encode blocks based on samples (pixels) from adjacent blocks. When the references cross sub-picture video stream boundaries, the references may become inaccurate due to loss of data in an adjacent sub-picture video stream. In order to mitigate these issues, the motion compensation component 521 and the intra-picture prediction component 517 of encoder 500 encode each sub-picture video stream to be self-contained. Specifically, the motion compensation component 521 and the intra-picture prediction component 517 are configured to only reference full sample locations in the same sub-picture video stream during encoding. Specifically, when a first sub-picture video stream is being encoded, the encoder 500 is prevented from referencing sample locations from other sub-picture video streams. This applies to both intra-prediction modes and inter-prediction motion vectors. Further, the motion compensation component 521 and the intra-picture prediction component 517 may reference fractional sample locations in the first sub-picture video stream, but only when the sample at the referenced fractional sample location can be recreated by interpolation based solely on sample locations inside the first sub-picture bitstream (e.g., without reference to any other sub-picture bitstream). Further, the motion compensation component 521 may generate motion vector candidate lists for a first sub-picture bitstream when performing inter-prediction. However, the motion compensation component 521 may not include motion vectors in the candidate list when the motion vectors are from blocks in another sub-picture bitstream. These restrictions ensure that each sub-picture bitstream can be decoded without reference to a neighbor sub-picture bitstream, and hence resolution based mismatches are avoided.

Further, video coding may employ parallelization, such as wavefront parallel processing (WPP), to speed up the video coding process. WPP allows a current block (e.g., CTU) to be coded so long as the block above the current block and the block above and to the right of the current block have already been decoded. WPP creates the impression of a wave, with the top row of blocks being coded two blocks ahead of the second row of blocks, which is two blocks ahead of the third row, etc. Sub-picture bitstream frames can be treated as tiles at the decoder, and the tiles can be merged to reconstruct the spherical video stream. WPP may not be configured to operate when tiles are present, because WPP operates on an entire frame at once (e.g., the frame from the spherical video stream) and not on a tile level. Accordingly, encoder 500 can disable WPP when encoding a sub-picture bitstream. For example, a entropy_coding_sync_enabled_flag is used by WPP. The flag is included in the picture parameter set (PPS) syntax for each picture. The encoder 500 can set the entropy_coding_sync_enabled_flag to zero to disable WPP for the sub-picture video streams.

Also, the encoder 500 can avoid timing mismatch issues between the sub-picture bitstreams by encoding the sub-picture video streams in tracks and ensuring the tracks have the same presentation time. Further, the encoder 500 can ensure each sample from a common VR picture (e.g., a frame in a spherical video stream) employs the same picture order count value even when such samples are split into different sub-picture bitstreams and/or carried in different tracks.

Figure 6:
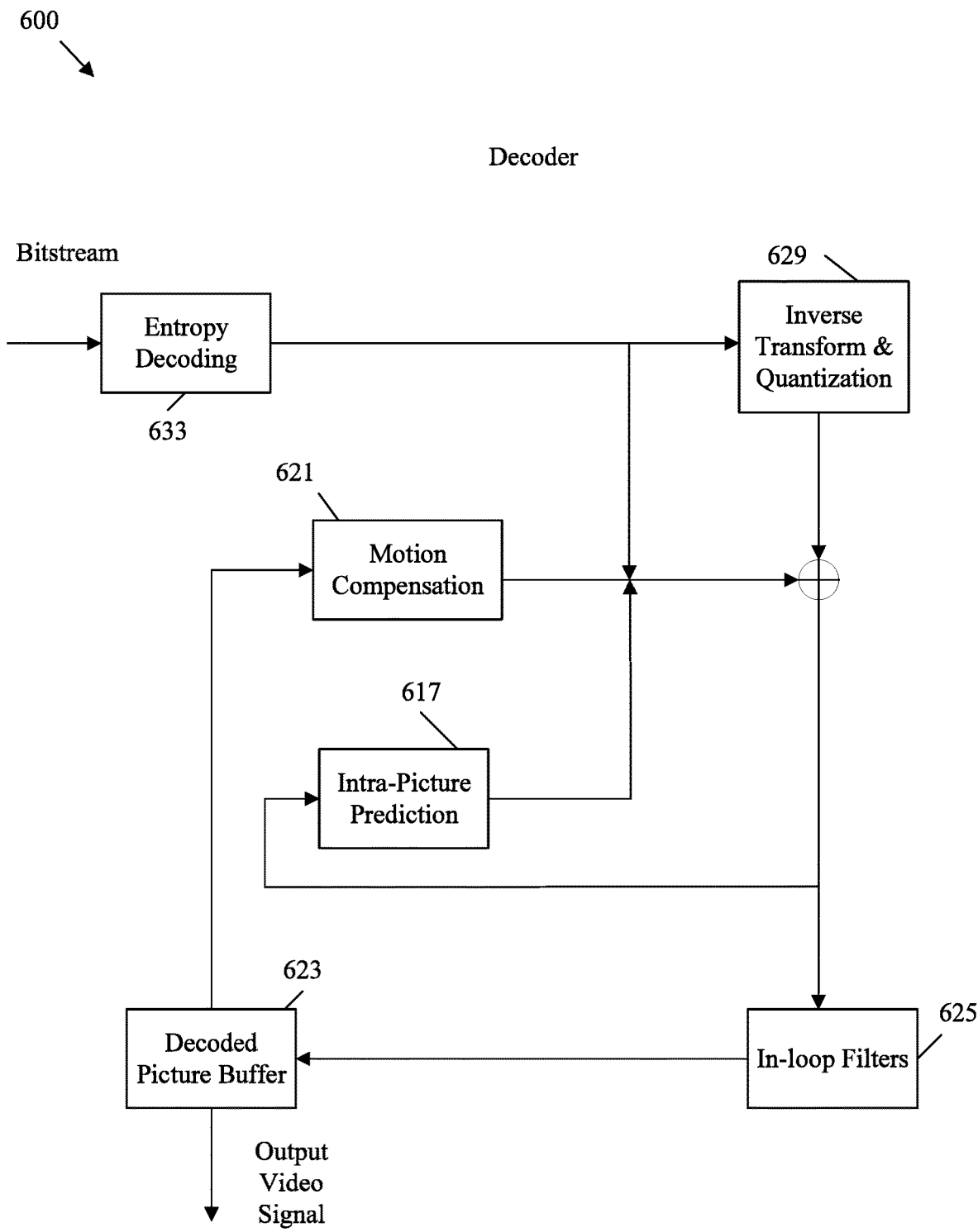
FIG. 6 is a schematic diagram illustrating an example video decoder.

FIG. 6 is a block diagram illustrating an example video decoder 600 that may decode sub-picture bitstreams. Video decoder 600 may be employed to implement the decoding functions of codec system 400 and/or implement steps 311, 313, 315, and/or 317 of operating method 300. Further, decoder 600 may be employed to implement steps 211-213 of method 200 as well as decoder 107. Decoder 600 receives a plurality of sub-picture bitstreams, for example from an encoder 500, generates a reconstructed output video signal including sub-picture video streams, merges the sub-picture video streams into a spherical video stream, and forwards the spherical video stream for display to a user via a rendering device.

The bitstreams are received by an entropy decoding component 633. The entropy decoding component 633 is configured to implement an entropy decoding scheme, such as CAVLC, CABAC, SBAC, PIPE coding, or other entropy coding techniques. For example, the entropy decoding component 633 may employ header information to provide a context to interpret additional data encoded as codewords in the bitstreams. The decoded information includes any desired information to decode the video signal, such as general control data, filter control data, partition information, motion data, prediction data, and quantized transform coefficients from residual blocks. The quantized transform coefficients are forwarded to an inverse transform and quantization component 629 for reconstruction into residual blocks. The inverse transform and quantization component 629 may be similar to inverse transform and quantization component 529.

The reconstructed residual blocks and/or prediction blocks are forwarded to intra-picture prediction component 617 for reconstruction into image blocks based on intra-prediction operations. The intra-picture prediction component 617 may be similar to intra-picture estimation component 415 and intra-picture prediction component 417. Specifically, the intra-picture prediction component 617 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 623 via an in-loop filters component 625, which may be substantially similar to decoded picture buffer component 423 and in-loop filters component 425, respectively. The in-loop filters component 625 filters the reconstructed image blocks, residual blocks and/or prediction blocks, and such information is stored in the decoded picture buffer component 623. Reconstructed image blocks from decoded picture buffer component 623 are forwarded to a motion compensation component 621 for inter-prediction. The motion compensation component 621 may be substantially similar to motion estimation component 421 and/or motion compensation component 419. Specifically, the motion compensation component 621 employs motion vectors from a reference block to generate a prediction block and applies a residual block to the result to reconstruct an image block. The resulting reconstructed blocks may also be forwarded via the in-loop filters component 625 to the decoded picture buffer component 623. The decoded picture buffer component 623 continues to store additional reconstructed image blocks, which can be reconstructed into frames via the partition information. Such frames may also be placed in a sequence. The sequence is output toward a display as a reconstructed output video signal.

Figure 7:
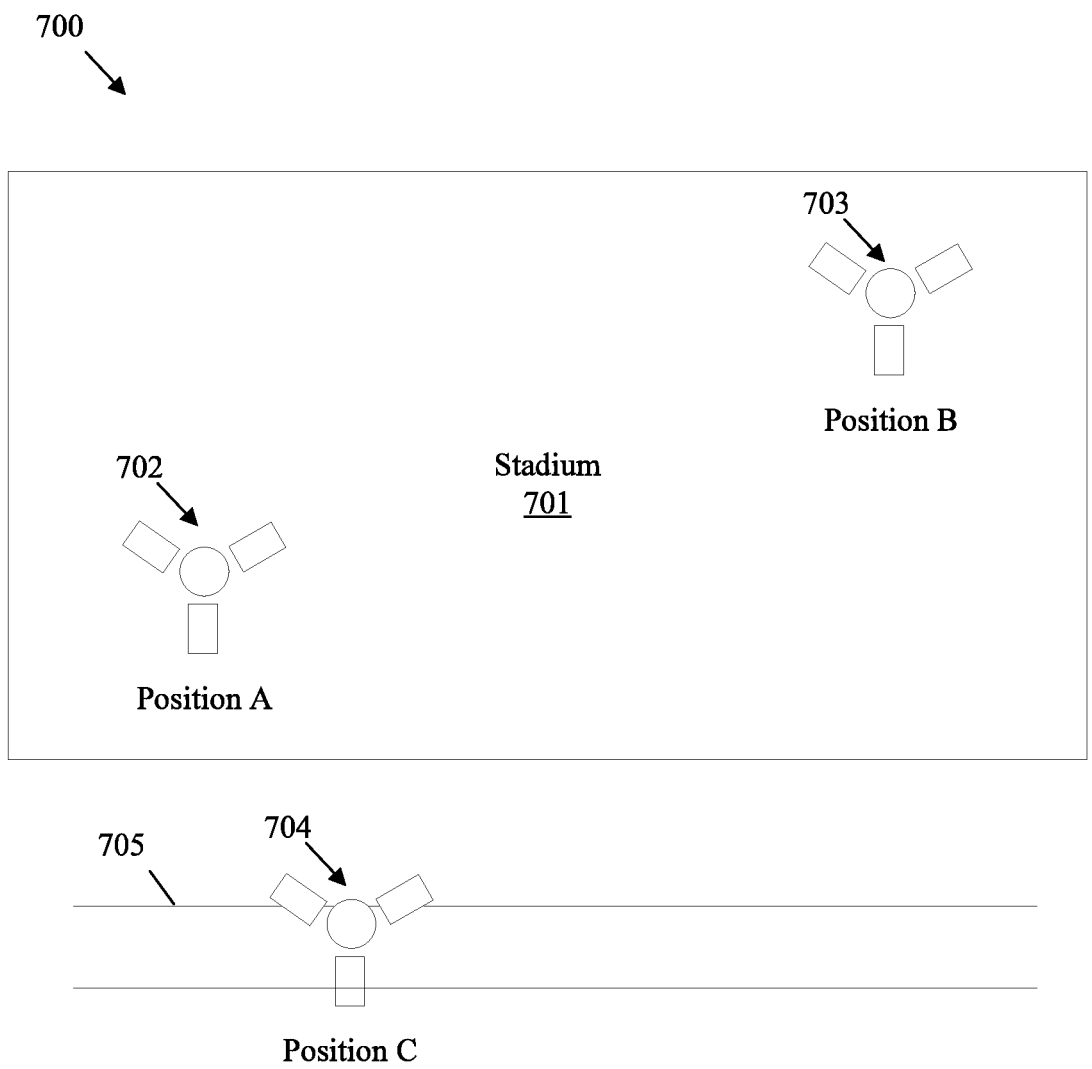
FIG. 7 is a schematic diagram illustrating an example of VR capturing in multiple positions.

FIG. 7 illustrates an example of VR capturing environment 700. As shown, the VR capturing environment 700 is implemented to capture activity at a particular scene 701 (e.g., a stadium) using a plurality of plurality of cameras 702, 703, 704. The cameras 702-704 may be similar to the multi-directional cameras 101 described above in connection with FIG. 1. In an embodiment, the cameras 702 and 703 may capture VR videos in fixed positions—i.e., Position A and Position B, together with the camera 704, which has the ability to continuously change positions along rail 705 in order to capture VR videos from a variety of different positions. In an embodiment, the camera 704 is disposed along a rail 705 in Position C. By sliding along the rail 705, the camera 704 is able to capture the VR video from different positions. In practical applications, the camera 704 may be mounted in other ways in order to be moveable in one or more directions.

In an embodiment, a user within the VR capturing environment 700 is able to change the VR viewport between the different positions (e.g., the different viewpoints, which are Position A, Position B, and Position C) given the information of these positions and related media tracks. Furthermore, a system may be designed such that when a hint about another viewpoint within the content of a viewpoint is available, the user can switch to that other viewpoint by clicking on the hint.

Whenever the viewport changes between viewpoints, the initial viewing orientation timed metadata track that is associated with the track(s) of the destination viewpoint can be used to indicate the viewing orientation.

A set of designs for signaling multiple viewpoints can be found in the MPEG input contribution document entitled "Coding of Moving Pictures and Audio," ISO/IEC JTC1/SC29/WG11 MPEG2018/M42457 by Yuqun Fang, et al., presented during the Apr. 18, 2018, meeting in San Diego, Calif.

Part 6 of ISO/IEC 23090, i.e., 23090-6, is expected to be a standard that specifies immersive media metrics. At the time of this disclosure, the latest draft specification of ISO/IEC 23090-6 was the working draft (WD) in MPEG output document N17400.

The ISO/IEC 23090-6 WD includes a description of the immersive media metrics client reference model, based on which the observation points are defined. Each immersive media metric should be collected at one of the defined observation points. Two immersive media metrics, namely the rendered FOV metric and the display information metric, are defined in the ISO/IEC 23090-6 WD.

The rendered FOV metric reports the horizontal and the vertical sizes of the rendered FOV, both in units of degrees. Through this metric, the VR streaming service provider may determine that some VR devices supporting different values of FOV are used to consume the VR streaming service. Consequently, the VR streaming service provider may prepare content that enables an optimized user experience for users using such VR devices.

The display information metric reports the display resolution in units of pixels, pixel density in units of pixels per inch, and refresh rate in units of hertz (Hz) of the VR device. Similarly, through this metric, the VR streaming service provider may determine that some VR devices support different values of display resolution, pixel density, and/or refresh rate, and that such values have been used to consume the VR streaming service. Consequently, the VR streaming service provider may prepare content that enables an optimized user experience for users using such VR devices.

The syntax format of the immersive media metrics is specified in the same way as the DASH metrics.

MPEG input document m42454 (Ahmed Hamza, Yong He, and Yan Ye, "[MPEG-I] VR metrics for Immersive Media Metrics WD," the 122nd MPEG meeting, April 2018, San Diego, Calif.) includes some concrete immersive media metrics as follows.

TABLE 1

Rendered viewports metrics

| Key | Type | Description |
|---|---|---|
| RenderedViewports | List | List of reportable viewport views |
| Entry | Object | |
| presentationTime | Media-Time | The presentation time at which the viewport was viewed. |
| duration | Integer | The viewing duration. |
| viewport | Viewport | The viewed viewport. |

PresentationTime specifies the media presentation time of the first sample at which the viewport is rendered. Duration specifies the duration of time in milliseconds that the viewport was viewed. Viewport specifies the region of the omnidirectional media corresponding to the viewport that is rendered at presentationTime.

TABLE 2

Viewport switching latency metric

| Key | Type | Description |
|---|---|---|
| ViewportSwitchingLatency | List | List of reportable viewport switching latencies. |
| Entry | Object | |
| firstViewport | Viewport | The first viewport |
| secondViewport | Viewport | The second viewport |
| t | Real-time | Time of the measurement. |
| latency | Integer | Viewport switching latency in milliseconds. |
| reason | List | Reference information indicating main source of latency. |

TABLE 2-continued

Viewport switching latency metric

| Key | Type | Description |
|---|---|---|
| Entry code | Object Enum | A possible cause for the latency. Either: Sensor delay Rendering engine delay Refresh rate |

FirstViewport specifies the spherical region corresponding to the first viewport (e.g., before the switching). SecondViewport specifies the spherical region corresponding to the second viewport (e.g., after the switching). t specifies the measurement time of the viewport switching latency in wall-clock time. Latency specifies the delay in milliseconds between the time a user movement from first viewport to second viewport and the time the corresponding media sample (audio, video, image, etc.) of the second viewport is rendered on the VR display. Reason is a list of possible causes of the latency.

TABLE 3

Comparable quality viewport switching latency metric

| Key | Type | Description |
|---|---|---|
| CQViewportSwitchingLatency | List | List of comparable quality viewport switching latencies. |
| Entry | Object | |
| firstViewport | Viewport | The first viewport. |
| secondViewport | Viewport | The second viewport. |
| firstViewportQuality | Integer | Quality value for the first viewport. |
| secondViewportQuality | Integer | Quality value for second viewport. |
| t | Real-Time | Time of the measurement. |
| latency | Integer | The comparable quality viewport switching latency in milliseconds. |
| reason | List | A list of causes for the latency. |
| Entry code | Object Enum | A possible cause for the latency. Either: Segment duration Buffer fullness Availability of comparable quality segment |

FirstViewport specifies the region of the first viewport before the switch. The viewport sample format SphereRegionStruct, as specified in ISO/IEC 23090-2 OMAF, can be re-used here to specify viewport. SecondViewport specifies the region of the second viewport after the switching. The sample format SphereRegionStruct, as specified in ISO/IEC 23090-2 OMAF, can be re-used here to specify the viewport. FirstViewportQuality specifies the quality value for the first viewport. SecondViewportQuality specifies the quality value for the second viewport. t specifies the wall clock time at which the latency was measured. Latency specifies the delay in milliseconds between the time at which the user moves from an initial viewing orientation corresponding to the first viewport towards a new viewing orientation corresponding to the second viewport and the time the quality of the second viewport presentation is the comparable to (e.g., greater than or equal to) the quality of the first viewport presentation. Reason is a list of possible causes of the latency.

TABLE 4

The recommended viewport hit metric

| Key | Type | Description |
|---|---|---|
| RecommendedViewportHit | List | A list of recommended viewport hits. |
| Entry | Object | |
| representationId | String | The representation id of the reference recommended viewport timed metadata. The value is larger than or equal to 1. |
| t | Real-Time | Time of measurement. |
| timestamp | Media-Time | The media presentation time. |
| duration | Integer | Time interval of the continuous viewport match. |
| type | Integer | Specifies the type of the recommended viewport. |

RepresentationId is the identifier of the recommended viewport's timed metadata representation in the MPD. This identifies which recommended viewport the comparison is performed against. t specifies the wall-clock time at which the metric was measured. Duration specifies the duration of continuous recommended viewport hits during the measurement interval. Type specifies the type of the recommended viewport, where value zero indicates the recommended viewport is for a director's cut, and value one indicates the recommended viewport is selected based on viewing statistics.

The viewport-related immersive media metrics have the following drawback. A viewport is a part of the sphere corresponding to one viewpoint. When VR content includes multiple viewpoints, the viewport-related immersive media metrics above cannot be used, as there is no way to indicate which viewpoint the viewport-related immersive media metric corresponds to.

To solve the problem described above, a viewpoint ID is included to one or more of each of the viewport-related immersive media metrics, e.g., the rendered viewports metric, the viewport switching latency metric, the comparable quality viewport switching latency metric, and the recommended viewport hit metric, such that it is clear which viewpoint such a metric corresponds to. The viewpoint ID can also be add to other metrics (e.g., immersive media metrics) that include information indicating multiple features related to the media played on the user device and/or information corresponding to virtual reality content having multiple viewpoints.

The definitions of the viewport-related immersive media metrics updated as follows.

TABLE 5

Rendered viewports metric

| Key | Type | Description |
|---|---|---|
| RenderedViewports | List | List of reportable viewport views |
| Entry | Object | |
| presentationTime | Media-Time | The presentation time at which the viewport was viewed. |

TABLE 5-continued

Rendered viewports metric

| Key | Type | Description |
|---|---|---|
| duration | Integer | The viewing duration. |
| viewpointId | Integer | The viewpoint to which the viewport belongs. |
| viewport | Viewport | The viewed viewport. |

PresentationTime specifies the media presentation time of the first sample at which the viewport is rendered. Duration specifies the duration of time in milliseconds that the viewport was viewed. ViewpointId indicates the viewpoint to which the viewport belongs. Viewport specifies the region of the omnidirectional media corresponding to the viewport that is rendered at presentationTime.

TABLE 6

Viewport switching latency metric

| Key | Type | Description |
|---|---|---|
| ViewportSwitchingLatency | List | List of reportable viewport switching latencies. |
| Entry | Object | |
| viewpointId | Integer | The viewpoint to which the viewports belong. |
| firstViewport | Viewport | The first viewport |
| secondViewport | Viewport | The second viewport |
| t | Real-time | Time of the measurement. |
| latency | Integer | Viewport switching latency in milliseconds. |
| reason | List | Reference information indicating main source of latency. |
| Entry | Object | |
| code | Enum | A possible cause for the latency. Either: Sensor delay Rendering engine delay Refresh rate |

ViewpointId indicates the viewpoint to which the viewports belong. FirstViewport specifies the spherical region corresponding to the first viewport (e.g., before the switching). SecondViewport specifies the spherical region corresponding to the second viewport (i.e., after the switching). t specifies the measurement time of the viewport switching latency in wall-clock time. Latency specifies the delay in milliseconds between the time a user movement from first viewport to second viewport and the time the corresponding media sample (audio, video, image, etc.) of the second viewport is rendered on the VR display. Reason is a list of possible causes of the latency.

TABLE 7

Comparable quality viewport switching latency metric

| Key | Type | Description |
|---|---|---|
| CQViewportSwitchingLatency | List | List of comparable quality viewport switching latencies. |
| Entry | Object | |
| viewpointId | Integer | The viewpoint to which the viewports belong. |
| firstViewport | Viewport | The first viewport. |
| secondViewport | Viewport | The second viewport. |
| firstViewportQuality | Integer | Quality value for the first viewport. |

TABLE 7-continued

Comparable quality viewport switching latency metric

| Key | | Type | Description |
|---|---|---|---|
| | secondViewportQuality | Integer | Quality value for second viewport. |
| | t | Real-Time | Time of the measurement. |
| | latency | Integer | The comparable quality viewport switching latency in milliseconds. |
| | reason | List | A list of causes for the latency. |
| | Entry | Object | |
| | code | Enum | A possible cause for the latency. Either: Segment duration Buffer fullness Availability of comparable quality segment | viewpointId indicates the viewpoint to which the viewports belong. FirstViewport specifies the region of the first viewport before the switch. The viewport sample format SphereRegionStruct, as specified in ISO/IEC 23090-2 OMAF, can be re-used here to specify viewport. SecondViewport specifies the region of the second viewport after the switching. The sample format SphereRegionStruct, as specified in ISO/IEC 23090-2 OMAF, can be re-used here to specify the viewport. FirstViewportQuality specifies the quality value for the first viewport. SecondViewportQuality specifies the quality value for the secondviewport. t specifies the wall clock time at which the latency was measured. Latency specifies the delay in milliseconds between the time at which the user moves from an initial viewing orientation corresponding to the first viewport towards a new viewing orientation corresponding to the second viewport and the time the quality of the second viewport presentation is the comparable to (i.e., greater than or equal to) the quality of the first viewport presentation. Reason is a list of possible causes of the latency.

TABLE 8

The recommended viewport hit metric

| Key | | Type | Description |
|---|---|---|---|
| RecommendedViewportHit | | List | A list of recommended viewport hits. |
| Entry | | Object | |
| | representationID | String | The representation id of the reference recommended viewport timed metadata. The value is larger than or equal to 1. |
| | viewpointID | Integer | The viewpoint to which the recommended viewport belongs. |
| | t | Real-Time | Time of measurement. |
| | timestamp | Media-Time | The media presentation time. |
| | duration | Integer | Time interval of the continuous viewport match. |
| | type | Integer | Specifies the type of the recommended viewport. | representationId is the identifier of the recommended viewport's timed metadata representation in the MPD. This identifies which recommended viewport the comparison is performed against. ViewpointId indicates the viewpoint to which the recommended viewport belongs. t specifies the wall-clock time at which the metric was measured. Duration specifies the duration of continuous recommended viewport hits during the measurement interval. Type specifies the type of the recommended viewport, where value zero indicates the recommended viewport is for a director's cut, and value one indicates the recommended viewport is selected based on viewing statistics.

Figure 8:
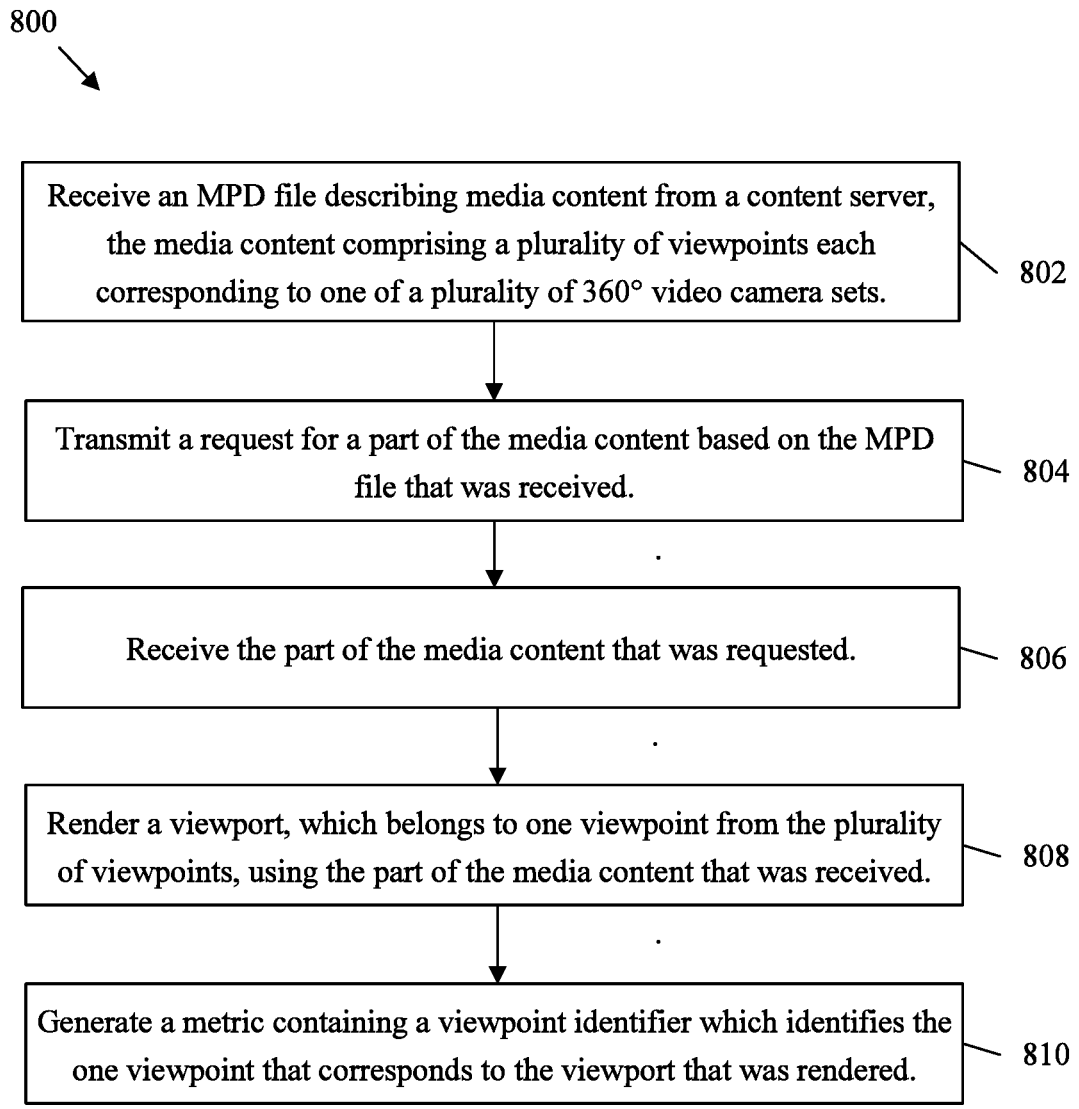
FIG. 8 is an embodiment of a method of video coding implemented by a client device.

The concepts disclosed above are described in the context of DASH. However, the concepts can be applied to any other video streaming systems, including HTTP adaptive media streaming as well as Real Time Streaming Protocol (RTSP)/(Real-time Transport Protocol)RTP based media streaming. Furthermore, the concepts can be individually applied or applied in combination FIG. 8 is an embodiment of a method 800 of three hundred and sixty degree (360°) streaming. In an embodiment, the method 800 is performed by a client device (e.g., a head mounted device, a smart phone, a tablet device, a computer, etc.). The client device may include a video decoder (e.g., decoder 107). The method 800 may be performed to ensure that the client device can properly identify for a content server the viewpoint to which a recommended viewport belongs to.

In block 802, an MPD file is received from a content server. In that regard, the MPD file may be received either directly or indirectly from the content server. In an embodiment, the content server is an HTTP server or an eXtensible Markup Language (XML) server. As noted above, the MPD file is an XML document containing information about media segments, their relationships and information needed to choose between them, and other metadata that may be needed by the client device to properly render and display the media content. In an embodiment, the MPD file describes a media content comprising a plurality of viewpoints each corresponding to one of a plurality of 360° video camera sets.

In block 804, the client device transmits a request for a part of the media content based on the MPD file that was received. In an embodiment, the request is transmitted directly or indirectly to the content server. The request may be, for example, a request for a part of a VR media content or a part of an omnidirectional media content. In an embodiment, the request specifies one or more parameters associated with the MPD file such as, for example, a period, an adaptation set, one or more representations, etc.

In block 806, the part of the media content that was requested by the client device is received. In an embodiment, the part of the media content is received either directly or indirectly from the content server. In an embodiment, the part of the media content is a part of a VR media content or a part of an omnidirectional media content.

In block 808, the client device renders a viewport using the media content that was received. The rendered viewport may be displayed for a client using the client device. As noted above, the viewport belongs to one viewpoint from the plurality of viewpoints. The plurality of viewpoints may be provided by, for example, the cameras 702-704 in FIG. 7.

In block 810, the client device generates a metric containing a viewpoint identifier (e.g., the viewpointID entry included in Tables 5-7 above). The viewpoint identifier identifies the particular viewpoint that the viewport that was rendered belongs to. In an embodiment, the viewport specifies a region of media content that was rendered at presentation time. In an embodiment, the metric is transmitted by the client device to, for example, the content server or another device in communication with the content server.

In an embodiment, the viewpoint identifier indicates that the particular viewpoint corresponds to the metric. In an embodiment, the viewpoint identifier comprises an entry of the metric. In an embodiment, the viewpoint identifier comprises an entry in a key column of the metric. In an embodiment, the viewpoint identifier comprises an integer. In an embodiment, the viewpoint identifier comprises an integer in a type column of the metric.

In an embodiment, the metric that was transmitted by the client device is a rendered viewports metric. In an embodiment, the metric is a viewport switching latency metric. In an embodiment, the metric is a comparable quality viewport switching latency metric. In an embodiment, the metric is a recommended viewport hit metric. In an embodiment, the metric is a viewport-related immersive media metric.

Figure 9:
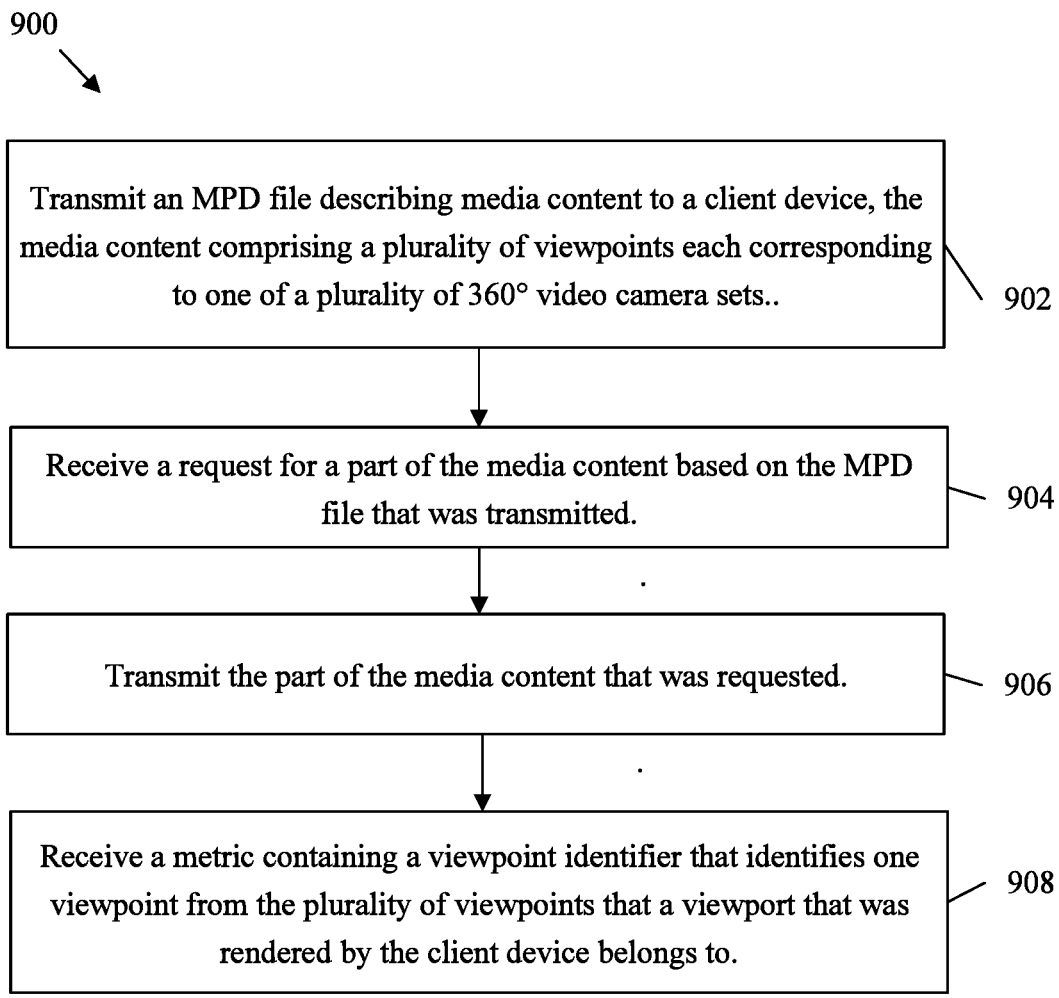
FIG. 9 is an embodiment of a method of video coding implemented by a content server.

FIG. 9 is an embodiment of a method 900 of 360° streaming. In an embodiment, the method 900 is performed by a content server (e.g., an HTTP or XML server). The content server may include a video encoder (e.g., encoder 103). The method 900 may be performed to ensure that the content server can properly identify the viewpoint to which a recommended viewport belongs.

In block 902, an MPD file is transmitted to a client device (e.g., a head mounted device, a smart phone, a tablet device, a computer, etc.). In that regard, the MPD file may be transmitted either directly or indirectly to the client device. As noted above, the MPD file is an XML document containing information about media segments, their relationships and information needed to choose between them, and other metadata that may be needed by the client device to properly render and display the media content. In an embodiment, the MPD file describes a media content comprising a plurality of viewpoints each corresponding to one of a plurality of 360° video camera sets.

In block 904, the content server receives a request for a part of the media content based on the MPD file that was transmitted. In an embodiment, the request is received directly or indirectly from the client device. The request may be, for example, a request for a VR media content or an omnidirectional media content. In an embodiment, the request specifies one or more parameters associated with the MPD file such as, for example, a period, an adaptation set, one or more representations, etc.

In block 906, the content server transmits the part of the media content that was requested. In an embodiment, the media content is transmitted either directly or indirectly to the client device. In an embodiment, the media content is a VR media content or an omnidirectional media content.

In block 908, the content server receives a metric containing a viewpoint identifier. In an embodiment, the viewpoint identifier identifies the particular viewpoint from the plurality of viewpoints that a viewport that was rendered by the client device belongs to.

In an embodiment, the viewport specifies a region of media content that was rendered at presentation time.

In an embodiment, the viewpoint identifier indicates that the particular viewpoint corresponds to the metric. In an embodiment, the viewpoint identifier comprises an entry of the metric. In an embodiment, the viewpoint identifier comprises an entry in a key column of the metric. In an embodiment, the viewpoint identifier comprises an integer. In an embodiment, the viewpoint identifier comprises an integer in a type column of the metric.

In an embodiment, the metric that was transmitted by the client device is a rendered viewpoints metric. In an embodiment, the metric is a viewport switching latency metric. In an embodiment, the metric is a comparable quality viewport switching latency metric. In an embodiment, the metric is a recommended viewport hit metric. In an embodiment, the metric is a viewport-related immersive media metric.

Figure 10:
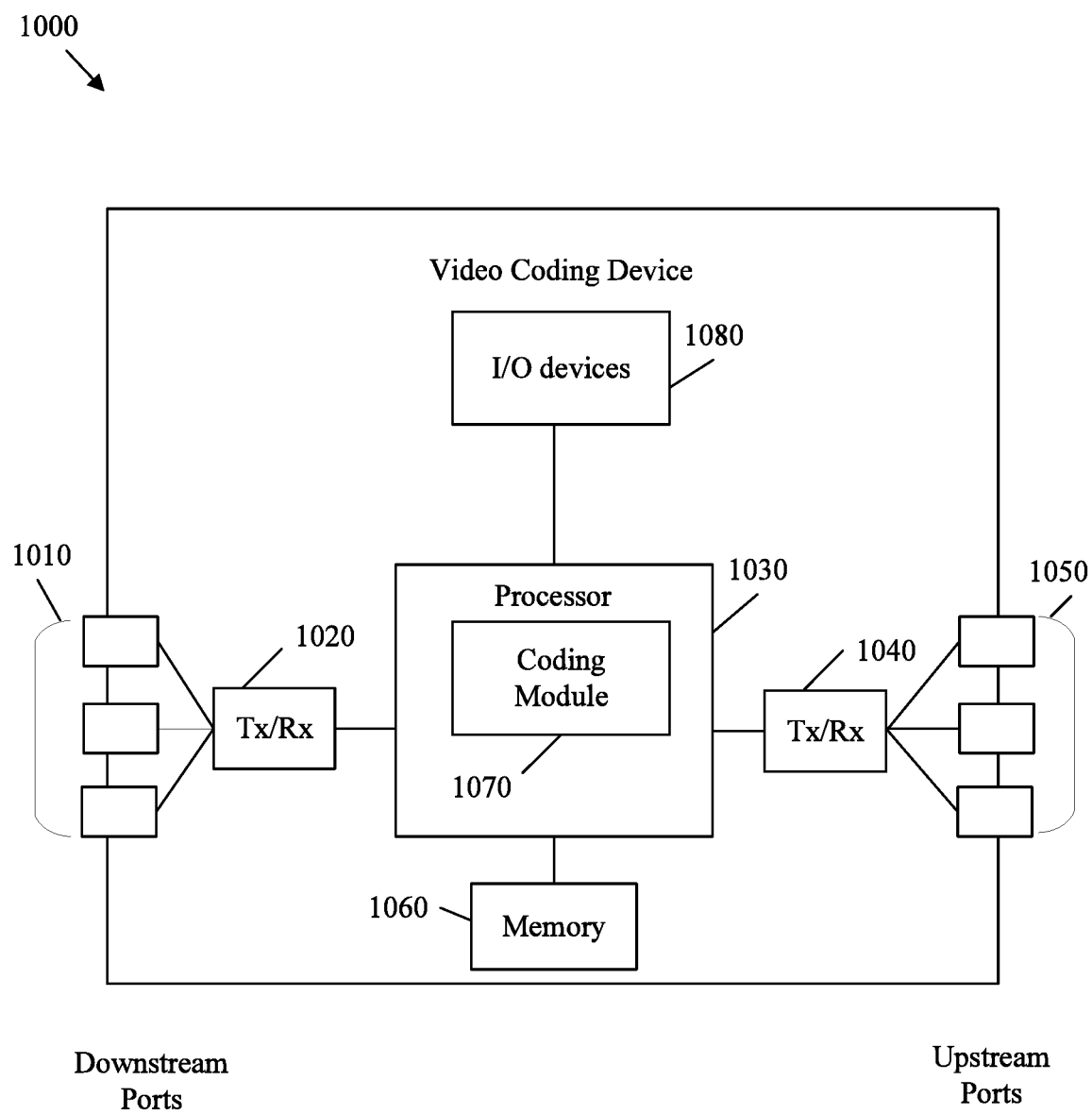
FIG. 10 is a schematic diagram of an example video coding device.

FIG. 10 is a schematic diagram of a coding device 1000 (e.g., a client device, a content server, etc.) according to an embodiment of the disclosure. The coding device 1000 is suitable for implementing the methods and processes disclosed herein. The coding device 1000 comprises ingress ports 1010 and receiver units (Rx) 1020 for receiving data; a processor, logic unit, or central processing unit (CPU) 1030 to process the data; transmitter units (Tx) 1040 and egress ports 1050 for transmitting the data; and a memory 1060 for storing the data. The coding device 1000 may also comprise optical-to-electrical (OE) components and electrical-to-optical (EO) components coupled to the ingress ports 1010, the receiver units 1020, the transmitter units 1040, and the egress ports 1050 for egress or ingress of optical or electrical signals.

The processor 1030 is implemented by hardware and software. The processor 1030 may be implemented as one or more CPU chips, cores (e.g., as a multi-core processor), field-programmable gate arrays (FPGAs), application specific integrated circuits (ASICs), and digital signal processors (DSPs). The processor 1030 is in communication with the ingress ports 1010, receiver units 1020, transmitter units 1040, egress ports 1050, and memory 1060. The processor 1030 comprises a coding module 1070. The coding module 1070 implements the disclosed embodiments described above. The inclusion of the coding module 1070 therefore provides a substantial improvement to the functionality of the coding device 1000 and effects a transformation of the coding device 1000 to a different state. Alternatively, the coding module 1070 is implemented as instructions stored in the memory 1060 and executed by the processor 1030.

The video coding device 1000 may also include input and/or output (I/O) devices 1080 for communicating data to and from a user. The I/O devices 1080 may include output devices such as a display for displaying video data, speakers for outputting audio data, etc. The I/O devices 1080 may also include input devices, such as a keyboard, mouse, trackball, etc., and/or corresponding interfaces for interacting with such output devices.

The memory 1060 comprises one or more disks, tape drives, and solid-state drives and may be used as an overflow data storage device, to store programs when such programs are selected for execution, and to store instructions and data that are read during program execution. The memory 1060 may be volatile and non-volatile and may be read-only memory (ROM), random-access memory (RAM), ternary content-addressable memory (TCAM), and static random-access memory (SRAM).

Figure 11:
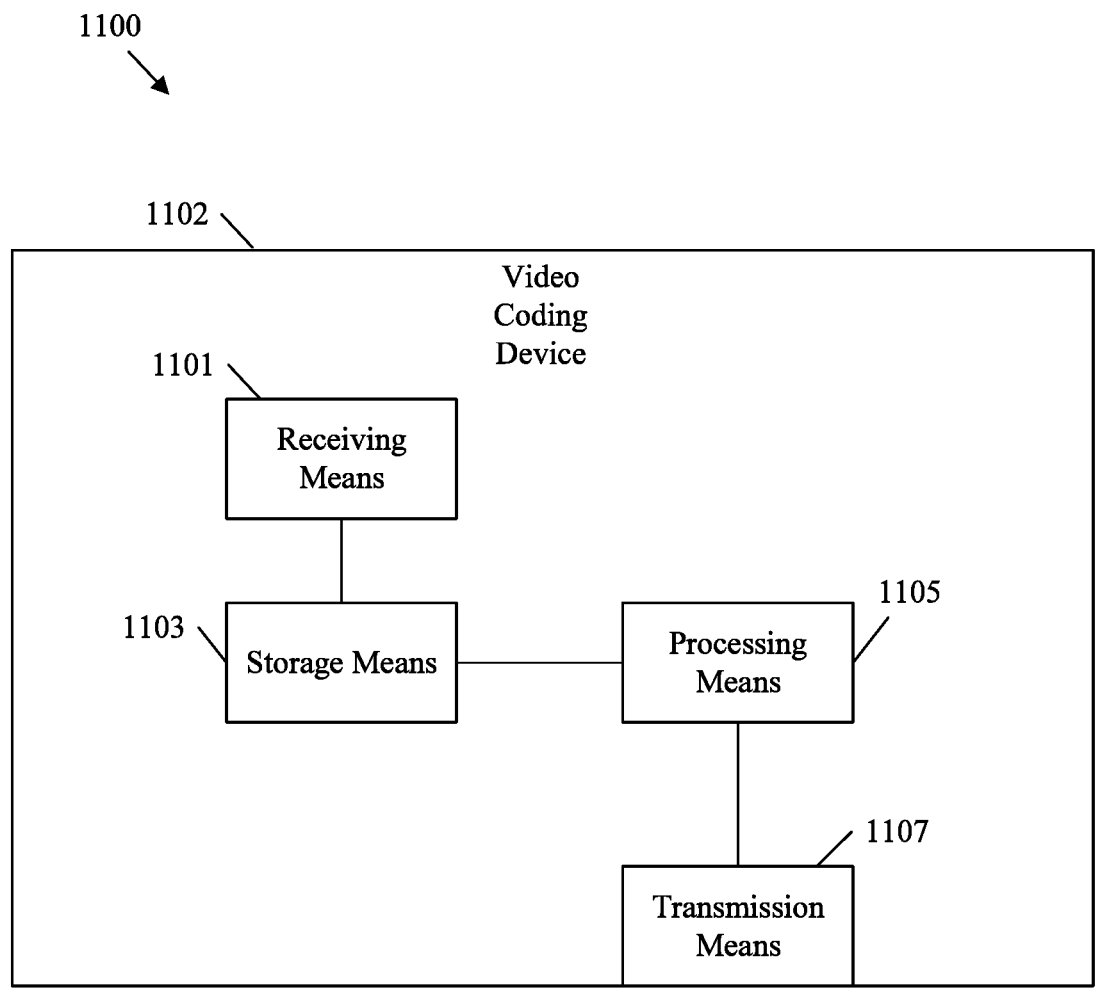
FIG. 11 is a schematic diagram of an embodiment of a means for coding.

FIG. 11 is a schematic diagram of an embodiment of a means for coding 1100. In embodiment, the means for coding 1100 is implemented in a video coding device 1102 (e.g., an encoder 103 or a decoder 107). The video coding device 1102 includes receiving means 1101. The receiving means 1101 is configured to receive a picture to encode or to receive a bitstream to decode. The video coding device 1102 includes transmission means 1107 coupled to the receiving means 1101. The transmission means 1107 is configured to transmit the bitstream to a decoder or to transmit a decoded image to a display means (e.g., one of the I/O devices 1080).

The video coding device 1102 includes a storage means 1103. The storage means 1103 is coupled to at least one of the receiving means 1101 or the transmission means 1107. The storage means 1103 is configured to store instructions.

The video coding device 1102 also includes processing means 1105. The processing means 1105 is coupled to the storage means 1103. The processing means 1105 is configured to execute the instructions stored in the storage means 1103 to perform the methods disclosed herein.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method of omnidirectional streaming implemented by a client device, the method comprising:
    receiving, by the client device, a media presentation description (MPD) file from a content server, the MPD file describing a media content, the media content comprising a plurality of viewpoints each corresponding to one of a plurality of omnidirectional video camera sets;
    transmitting, by the client device, a request for a part of the media content based on the MPD file that was received;
    receiving, by the client device, the part of the media content that was requested;
    rendering, by the client device, a viewport using the part of the media content that was received, the viewport belonging to one viewpoint from the plurality of viewpoints;
    generating, by the client device, a metric containing a viewpoint identifier, the viewpoint identifier identifying the viewpoint of an omnidirectional video camera to which the viewport that was rendered belongs; and
    transmitting, by the client device, the metric containing the viewpoint identifier to the content server.

2. The method of claim 1, wherein the client device is a head mounted display (HMD).

3. The method of claim 1, wherein the content server is a hypertext transport protocol (HTTP) content server or an eXtensible Markup Language (XML) server.

4. The method of claim 1, wherein the metric is one of a rendered viewports metric, a viewport switching latency metric, a comparable quality viewport switching latency metric, or a recommended viewport hit metric.

5. The method of claim 1, wherein the metric includes information indicating multiple features corresponding to the media content.

6. The method of claim 1, wherein the viewport specifies a region of media content that was rendered at presentation time, and wherein the media content is virtual reality (VR) media content.

7. The method of claim 1, wherein the metric is a viewport-related immersive media metric.

8. The method of claim 1, wherein the viewpoint identifier comprises an entry of the metric.

9. The method of claim 1, wherein the viewpoint identifier comprises an entry in a key column of the metric.

10. A method of omnidirectional streaming implemented by a content server, the method comprising:
    transmitting, by the content server, a media presentation description (MPD) file to a client device, the MPD file describing a media content, the media content comprising a plurality of viewpoints each corresponding to one of a plurality of omnidirectional video camera sets;
    receiving, by the content server, a request for a part of the media content based on the MPD file that was transmitted;
    transmitting, by the content server, the part of the media content that was requested; and
    receiving, by the content server, a metric containing a viewpoint identifier, the viewpoint identifier identifying one viewpoint of an omnidirectional video camera from the plurality of viewpoints to which a viewport rendered by the client device belongs.

11. The method of claim 10, wherein the client device is a head mounted display (HMD).

12. The method of claim 10, wherein the content server is a hypertext transport protocol (HTTP) content server or an eXtensible Markup Language (XML) server.

13. The method of claim 10, wherein the metric is one of a rendered viewports metric, a viewport switching latency metric, a comparable quality viewport switching latency metric, or a recommended viewport hit metric.

14. The method of claim 10, wherein the metric includes information indicating multiple features corresponding to the media content.

15. The method of claim 10, wherein the viewport specifies a region of media content that was rendered at presentation time.

16. A client device, comprising:
    a memory storing instructions;
    a processor coupled to the memory, the processor configured to execute the instructions to cause the client device to:
        receive a media presentation description (MPD) file from a content server, the MPD file describing a media content, the media content comprising a plurality of viewpoints each corresponding to one of a plurality of omnidirectional video camera sets;
        transmit a request for a part of the media content based on the MPD file that was received;
        receive the part of the media content that was requested;
        render a viewport using the part of the media content that was received, the viewport belonging to one viewpoint from the plurality of viewpoints; and
        generate a metric containing a viewpoint identifier, the viewpoint identifier identifying the viewpoint of an omnidirectional video camera to which the viewport that was rendered belongs;
    a transmitter coupled to the processor, the transmitter configured to transmit the metric containing the viewpoint identifier to the content server.

17. The client device of claim 16, further comprising a display configured to display an image.

18. The client device of claim 16, wherein the client device is a head mounted display (HMD).

19. The client device of claim 16, wherein the metric is one of a rendered viewports metric, a viewport switching latency metric, a comparable quality viewport switching latency metric, or a recommended viewport hit metric.

20. The client device of claim 16, wherein the metric includes information indicating multiple features corresponding to the media content.

\* \* \* \* \*

UNITED STATES PATENT AND TRADEMARK OFFICE
CERTIFICATE OF CORRECTION

| | |
|---|---|
| PATENT NO. | : 11,438,600 B2 |
| APPLICATION NO. | : 16/999564 |
| DATED | : September 6, 2022 |
| INVENTOR(S) | : Ye-Kui Wang |

It is certified that error appears in the above-identified patent and that said Letters Patent is hereby corrected as shown below:

On the Title Page

(57) Abstract, should read:
A method of three hundred and sixty degree (360°) streaming implemented by a client device. The method includes receiving, by the client device, a media presentation description (MPD) file from a content server, the MPD file describing a media content, the media content comprising a plurality of viewpoints each corresponding to one of a plurality of 360° video camera sets; transmitting, by the client device, a request for a part of the media content based on the MPD file that was received; receiving, by the client device, the part of the media content that was requested; rendering, by the client device, a viewport using the part of the media content that was received, the viewport belonging to one viewpoint from the plurality of viewpoints; and generating, by the client device, a metric containing a viewpoint identifier, the viewpoint identifier identifying the viewpoint that the viewport that was rendered belongs to.

Signed and Sealed this
Twenty-fifth Day of October, 2022

Katherine Kelly Vidal
*Director of the United States Patent and Trademark Office*